United States Patent
Kadono

(10) Patent No.: US 8,948,255 B2
(45) Date of Patent: Feb. 3, 2015

(54) MOVING PICTURE CODING METHOD FOR QUANTIZING A PLURALITY OF PICTURES USING A QUANTIZATION STEP AND A SMALL QUANTIZATION STEP HAVING A SIZE SMALLER THAN A SIZE OF THE QUANTIZATION STEP

(75) Inventor: Shinya Kadono, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 399 days.

(21) Appl. No.: 13/054,946

(22) PCT Filed: Sep. 29, 2009

(86) PCT No.: PCT/JP2009/004954
§ 371 (c)(1),
(2), (4) Date: Jan. 20, 2011

(87) PCT Pub. No.: WO2010/035505
PCT Pub. Date: Apr. 1, 2010

(65) Prior Publication Data
US 2011/0122943 A1 May 26, 2011

(30) Foreign Application Priority Data
Sep. 29, 2008 (JP) .................................. 2008-251455

(51) Int. Cl.
*H04N 11/02* (2006.01)
(52) U.S. Cl.
USPC .................................................... 375/240.03
(58) Field of Classification Search
CPC .............. H04N 19/00; H04N 19/0009; H04N 19/00278; H04N 19/00169; H04N 19/00951; H04N 19/00121

USPC ........................................ 375/240.01–240.29
See application file for complete search history.

(56) References Cited

U.S. PATENT DOCUMENTS

| 5,089,888 A | 2/1992 | Zdepski et al. |
| 5,136,376 A * | 8/1992 | Yagasaki et al. ......... 375/240.23 |

(Continued)

FOREIGN PATENT DOCUMENTS

| EP | 0 434 427 | 6/1991 |
| JP | 8-280031 | 10/1996 |
| JP | 11-355777 | 12/1999 |

OTHER PUBLICATIONS

Extended European Search Report dated Feb. 24, 2012 in corresponding European Patent Application No. 09815924.7.

(Continued)

*Primary Examiner* — Dave Czekaj
*Assistant Examiner* — Leron Beck
(74) *Attorney, Agent, or Firm* — Wenderoth, Lind & Ponack, L.L.P.

(57) ABSTRACT

A moving picture coding device according to the present invention includes: a QP deriving unit which derives, based on a moving picture signal, a quantization step and a small quantization step having a size smaller than a size of the quantization step; a small QP position determining unit which determines a position, within a picture, of a first block group to be quantized by using the small quantization step; and a video encoder which quantizes the first block group at the determined position by using the small quantization step and a second block group at a position within the picture other than the position of the first block group by using the quantization step.

11 Claims, 24 Drawing Sheets

(56) References Cited

U.S. PATENT DOCUMENTS

| | | | | |
|---|---|---|---|---|
| 5,550,935 | A | * | 8/1996 | Erdem et al. ............... 382/260 |
| 5,696,698 | A | * | 12/1997 | Herluison et al. ........... 345/557 |
| 6,389,073 | B1 | | 5/2002 | Kurobe et al. |
| 6,404,812 | B1 | | 6/2002 | Martins et al. |
| 6,466,620 | B1 | * | 10/2002 | Lee ........................ 375/240.03 |
| 8,279,942 | B2 | * | 10/2012 | Ito et al. ................. 375/240.26 |
| 2005/0111548 | A1 | * | 5/2005 | Lee et al. ................ 375/240.12 |

OTHER PUBLICATIONS

International Search Report issued Dec. 28, 2009 in International (PCT) Application No. PCT/JP2009/004954.

MPEG-2 standard: ISO/IEC 13818-2, "Information Technology-Generic Coding of Moving Pictures and Associated Audio Information: Video", International Standard, Second Edition, Dec. 2000.

* cited by examiner

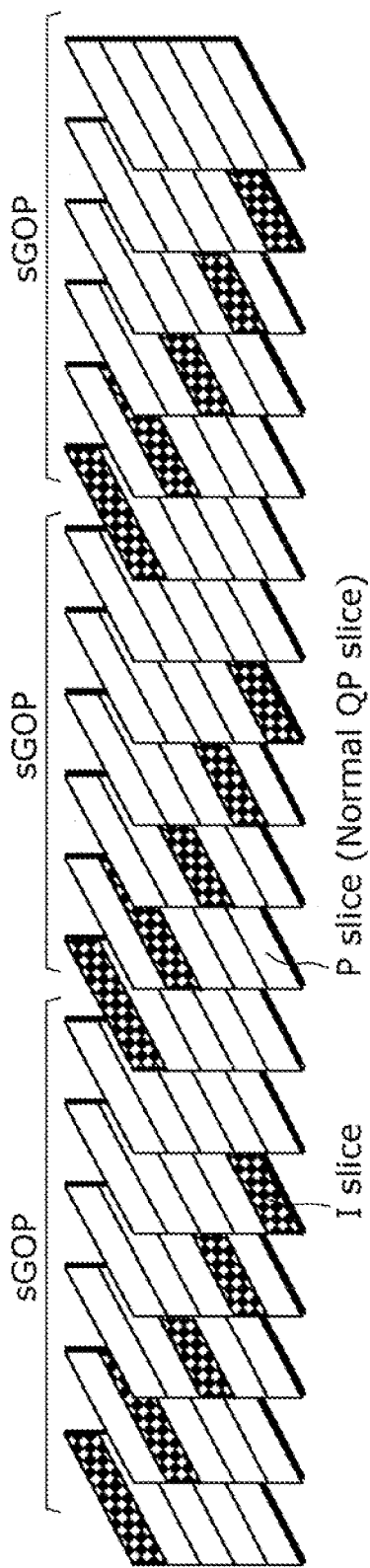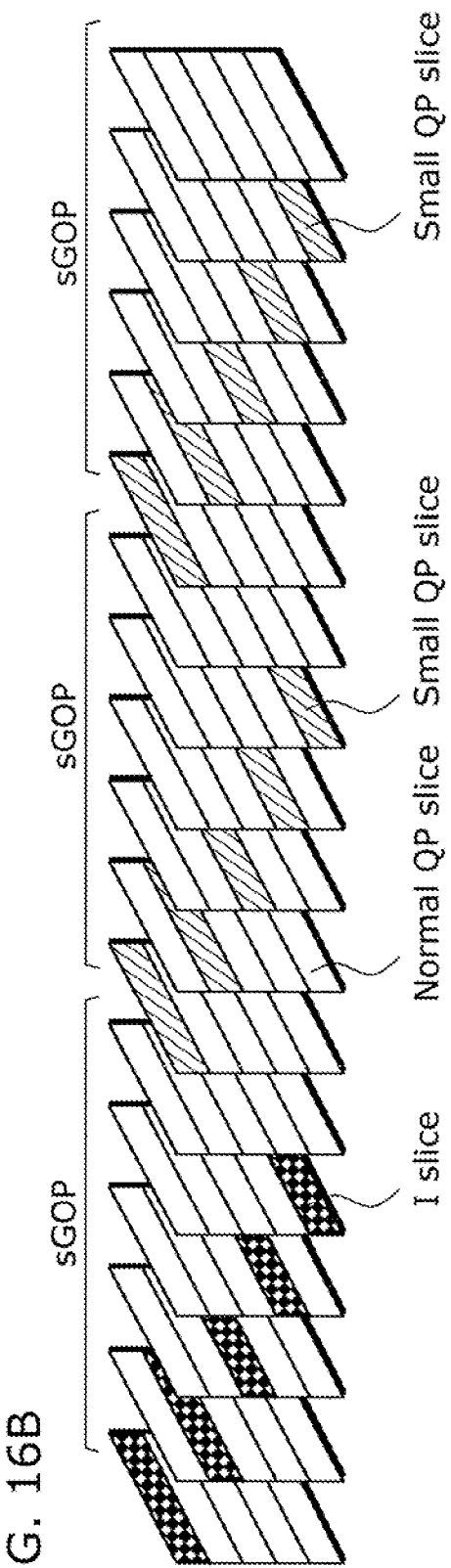
FIG. 16A
FIG. 16B

MOVING PICTURE CODING METHOD FOR QUANTIZING A PLURALITY OF PICTURES USING A QUANTIZATION STEP AND A SMALL QUANTIZATION STEP HAVING A SIZE SMALLER THAN A SIZE OF THE QUANTIZATION STEP

TECHNICAL FIELD

The present invention relates to a moving picture coding method and a moving picture coding device. The present invention particularly relates to a moving picture coding method and a moving picture coding device which code picture signals per block in accordance with the Moving Picture Experts Group (MPEG)-4 standard or the ITU-T H.264 standard.

BACKGROUND ART

Recently, with the advent of the multimedia era where audio, images, and other pixel values are integrally handled, conventional information media as communication tools, including newspapers, magazines, TVs, radios, and telephones, have come to be under the scope of multimedia. Generally, multimedia refers to a representation in which not only text but also graphics, audio, and particularly pictures are simultaneously associated with one another. In order to handle such conventional information as multimedia, the information must be digitalized.

When estimating the amount of information in each of the pieces of information media by using an amount of digital information, the information amount per text character requires 1 to 2 bytes. Audio requires 64 Kbits per second (telephone quality); and furthermore, moving pictures require more than 100 Mbits per second (reception quality of current television). It is therefore not practical to handle these massive amounts of multimedia information in digital format. For example, a video phone is now in practical use via Integrated Services Digital Network (ISDN) with a transmission rate of 64 Kbits/s to 1.5 Mbits/s. However, images of TVs and cameras cannot be transmitted with the original digital information amount over the ISDN.

Therefore, information compression techniques are essential. For example, the video phone uses moving picture compression techniques compliant with H.261 or H.263 standard recommended by ITU-T (International Telecommunication Union-Telecommunication Standardization Sector). Using the information compression techniques compliant with MPEG-1, picture information can be stored together with audio information on a general music compact disc (CD).

The Moving Picture Experts Group (MPEG) refers to an international standard for compression of moving picture signals and has been standardized by the International Organization for Standardization and the International Electrotechnical Commission (ISO/IEC). MPEG-1 is a standard to compress moving picture signals down to 1.5 Mbits/s, that is, to compress information of TV signals approximately down to one hundredth. The transmission rate within the MPEG-1 standard is set to about 1.5 Mbits/s for a picture of medium quality. MPEG-2 is thus standardized to meet the need for higher picture quality. MPEG-2 enables transmission of moving picture signals at 2 to 15 Mbits/s to achieve television broadcast quality. Furthermore, at present, the working group (ISO/IEC JTC1/SC29/WG11) in charge of the standardization of MPEG-1 and MPEG-2 has standardized MPEG-4. The MPEG-4 achieves a compression rate higher than those of MPEG-1 and MPEG-2, and further enables coding and decoding operations on an object-by-object basis, and thereby achieves new functions necessary in this multi-media era. The initial object of MPEG-4 was to standardize a low-bit-rate coding method; however, the object has been extended to include a more versatile coding of moving pictures including interlaced pictures at a high bit rate. Moreover, at present, MPEG-4 AVC and ITU-T H.264 have been standardized as picture coding systems with higher compression rate through an ISO/IEC and ITU-T joint project.

Here, a picture signal can be considered as a sequence of pictures (also referred to as frames or fields) each of which is a group of pixels having the same time. Neighboring pixels in each picture have a strong correlation with each other; and thus, the correlation between the pixels within a picture is used in the compression. Furthermore, consecutive pictures have high correlation between pixels; and thus the pixel correlation between the pictures is also used in the compression. Here, compression using a correlation between pixels in different pictures and a correlation between pixels within a picture is referred to as inter-coding, whereas compression using the correlation between pixels within a picture without using the correlation between pixels in different pictures is referred to as intra-coding. The inter-coding that uses the correlation between pictures can achieve a compression rate higher than that of the intra-coding. In MPEG-1, MPEG-2, MPEG-4, MPEG-4 AVC, and H.264, each picture includes blocks (or macroblocks) each of which is a group of pixels in a two-dimensional rectangular area, and the inter-coding and the intra-coding are switched per block.

In the case of intra-coding, each picture includes blocks of predictive errors using the correlation between pixel blocks within a picture or the correlation between pixels within a picture. In the case of inter-coding, each picture includes blocks of predictive errors using the correlation between pictures. A two-dimensional orthogonal transform, such as a discrete cosine transform (DCT), is performed on such blocks included in each picture. The frequency components of the blocks on which the two-dimensional orthogonal transform has been performed are quantized with a predetermined quantization step (size). The quantized value is variable length coded and transmitted to, for example, a network.

In the quantization, a larger quantization step results in a higher compression rate with a larger picture coding distortion, and a smaller quantization step results in a lower compression rate with a smaller picture coding distortion. Here, the quantization step refers to the size of quantization, and indicates how precisely the quantization is performed.

In the case of coding moving pictures, quantization steps are generally calculated such that the bit rate indicating data amount per second is constant and the quantization steps within a picture are approximately the same. The bit rate is set as constant because the bit rate of transmitting coded streams over the network is constant. to The approximately constant quantization steps are set within a picture because if the degree of the coding distortion varies depending on the position within a picture (horizontal position, vertical position), that is, if the quantization steps within a picture are not uniform, the coding distortion is likely to be noticeable.

As described, in general, in the case of coding moving pictures, a control is performed such that a uniform quantization step is used within a picture. Such a control has an advantage that the coding distortion becomes uniform and the coding distortion is not likely to be noticeable at a certain position.

In networks, with widespread high-speed network environments using Asymmetric Digital Subscriber Lines (ADSLs) and optical fibers, general households can now transmit and receive information at a bit rate over several Mbits/s. Furthermore, it is likely that information can be transmitted and received at several tens of Mbits/s in the next few years. Thus, it is expected that with the picture coding technique, not only companies using dedicated lines but also general households will bring in video phone and teleconferencing systems of television broadcast quality, HDTV broadcast quality, and super HDTV quality in the future.

When coded picture data that is a stream is transmitted through a network, part of the stream may be lost due to, for example, network congestion. When the part of the stream is lost, a receiver cannot properly decode a picture corresponding to the lost part of the stream, thereby causing degradation in picture quality. In addition, in the subsequent pictures, decoding of streams inter-coded with reference to the picture corresponding to the lost part of the stream also involves degradation in picture quality. To prevent this, a coding unit which is a group of blocks is defined as a slice. A slice is a minimum unit of independent coding and decoding. Decoding can be performed per slice even when part of a stream is lost. For example, as shown in FIG. 22, there is a conventional technique where each picture is divided into slices in five rows. One of the slices is I-slice and the position of the I-slice within a picture cyclically shifts through temporally consecutive pictures. Here, the I-slice refers to an intra-coded slice. Even when part of a stream is lost due to network congestion or the like, the technique allows proper decoding at the receiver without being influenced by the lost of the part of the stream. In other words, the cyclic shift of the I-slice prevents errors caused due to network congestion or the like from influencing the decoding of subsequent pictures in inter-coding.

FIG. 23 is a diagram illustrating a relationship between slices and blocks in a slice division scheme in accordance with MPEG-2. A picture (one frame) shown in FIG. 23 includes a plurality of blocks. The blocks in a same row make up of a slice.

FIG. 24 is a diagram illustrating a coding order of blocks in a picture. The blocks in the picture shown in FIG. 23 are coded in the order indicated in FIG. 24, that is, the order from left to right within each slice and from a top slice to a bottom slice within a picture. The blocks in each picture are coded in such a coding order so that a stream is generated.

CITATION LIST

Non Patent Literature

[NPL 1]
MPEG-2 standard: ISO/IEC 13818-2,"Information Technology-Generic Coding Of Moving Pictures And Associated Audio Information: Video", International Standard, Second Edition, December 2000

SUMMARY OF INVENTION

Technical Problem

However, in general, in the case where moving pictures that are consecutive pictures are inter-coded at a high compression rate and where the consecutive pictures include a picture having a large coding distortion, subsequent pictures in the coding order are compressed using the inter-picture correlation with the picture having a large coding distortion. Thus, the subsequent pictures also include large coding distortion, which leads to visually noticeable coding distortion particularly in moving pictures having slight motion.

The present invention has been conceived in view of the problems, and has an object to achieve a moving picture coding method and a moving picture coding device which reduce coding distortion in inter-coding which uses inter-picture correlation particularly in the case where there is not much partial loss of a stream caused due to network congestion or the like.

Solution to Problem

In order to solve the problems, the moving picture coding device according to an aspect of the present invention is a moving picture coding device which quantizes, per block, a plurality of pictures by using a quantization step and codes the quantized pictures, the plurality of pictures being temporally consecutive and included in a moving picture signal. The moving picture coding device includes: a quantization step deriving unit which derives, based on the moving picture signal, a quantization step and a small quantization step having a size smaller than a size of the quantization step; a position determining unit which determines a position, within each of the plurality of pictures, of a first block group to be inter-coded or intra-coded per block, the first block group including one or more blocks to be quantized by using the small quantization step; and a coding unit which quantizes the first block group by using the small quantization step and a second block group by using the quantization step, and to code the quantized first and second block groups, the first block group being at the position determined by the position determining unit, the second block group including one or more blocks at a position within the picture other than the position determined by the position determining unit, the second block group being to be inter-coded or intra-coded per block, wherein the position determining unit determines the position of the first block group within the picture such that the position of the first block group within the picture cyclically shifts in a coding order direction in each of a predetermined number of pictures that are temporally consecutive among the plurality of pictures that are temporally consecutive.

The present invention can be implemented not only as a device, but also as an integrated circuit including processing units included in such a device or as a method using the processing units included in the device as steps. In addition, the present invention can be implemented as a program causing a computer to execute such steps, and as information, data, or a signal indicating the program. The program, information, data, and signal may be distributed through recording media such as a CD-ROM, or through communication media such as the Internet.

Advantageous Effects Of Invention

According to the present invention, it is possible to achieve a moving picture coding method and a moving picture coding device which reduce coding distortion in inter-coding pictures using inter-picture correlation.

More specifically, a slice or a block to be coded with a small quantization step is included in a picture and the position of the slice or the block within a picture shifts through consecutive pictures. In this way, the slice or the block to be coded with the small quantization step cyclically shifts in a predetermined cycle. Accordingly, among a predetermined cycle of the consecutive pictures, inter-coding which causes less coding distortion is performed in the cycle at each of the positions of the slices or blocks included in the pictures.

Here, due to (1) and (2) below, the coding distortion in blocks with slight motion decreases, allowing the coding distortion to be visually less noticeable.

(1) In the blocks with slight motion in the moving pictures, as the coding distortion of a picture (a reference picture) using pixel correlation is smaller, the compression rate of the inter-coding increases, thereby leading to smaller coding distortion. Thus, coding a picture with a small quantization step reduces the coding distortion in a picture to be coded with reference to the picture coded with the small quantization step.

(2) The coding distortion in blocks with slight motion is likely to be more noticeable than that in blocks with large motion, because tracking images by eyes is easier in the blocks with slight motion than in the blocks with large motion.

Furthermore, the number of bits at the time of coding of each picture can be maintained approximately constant in consecutive pictures, by setting the small quantization step to only some of the blocks in each picture, thereby allowing transmission over the network at a constant bit rate.

When the quantization step within a picture is not approximately uniform, the coding distortion is likely to be noticeable. However, the present invention also solves the problem. This is due to the following reasons.

(1) The position of the slice to be coded with a small quantization step cyclically shifts; and thus, each picture has a chance to be coded with the small quantization step.

(2) In the inter-coding, when a picture is coded with reference to a picture coded with the small quantization step, coding distortion is often not noticeable even when the quantization step is not small. The reason is that in general, as smaller the motion in a picture is, the coding distortion in the inter-coding is as small as the coding distortion of a reference picture. In a picture with large motion, even when the quantization step within a picture is not constant, degradation in picture quality is less noticeable.

BRIEF DESCRIPTION OF DRAWINGS

FIG. 16A is a diagram illustrating an example where I-slices are inserted in temporally consecutive pictures according to Embodiment 6 of the present invention.

FIG. 16B is a diagram illustrating an example where I-slices or small QP slices are inserted in temporally consecutive pictures io according to Embodiment 6 of the present invention.

Hereinafter, Embodiments of the present invention are described with reference to the drawings.

(Embodiment 1)

Figure 1:
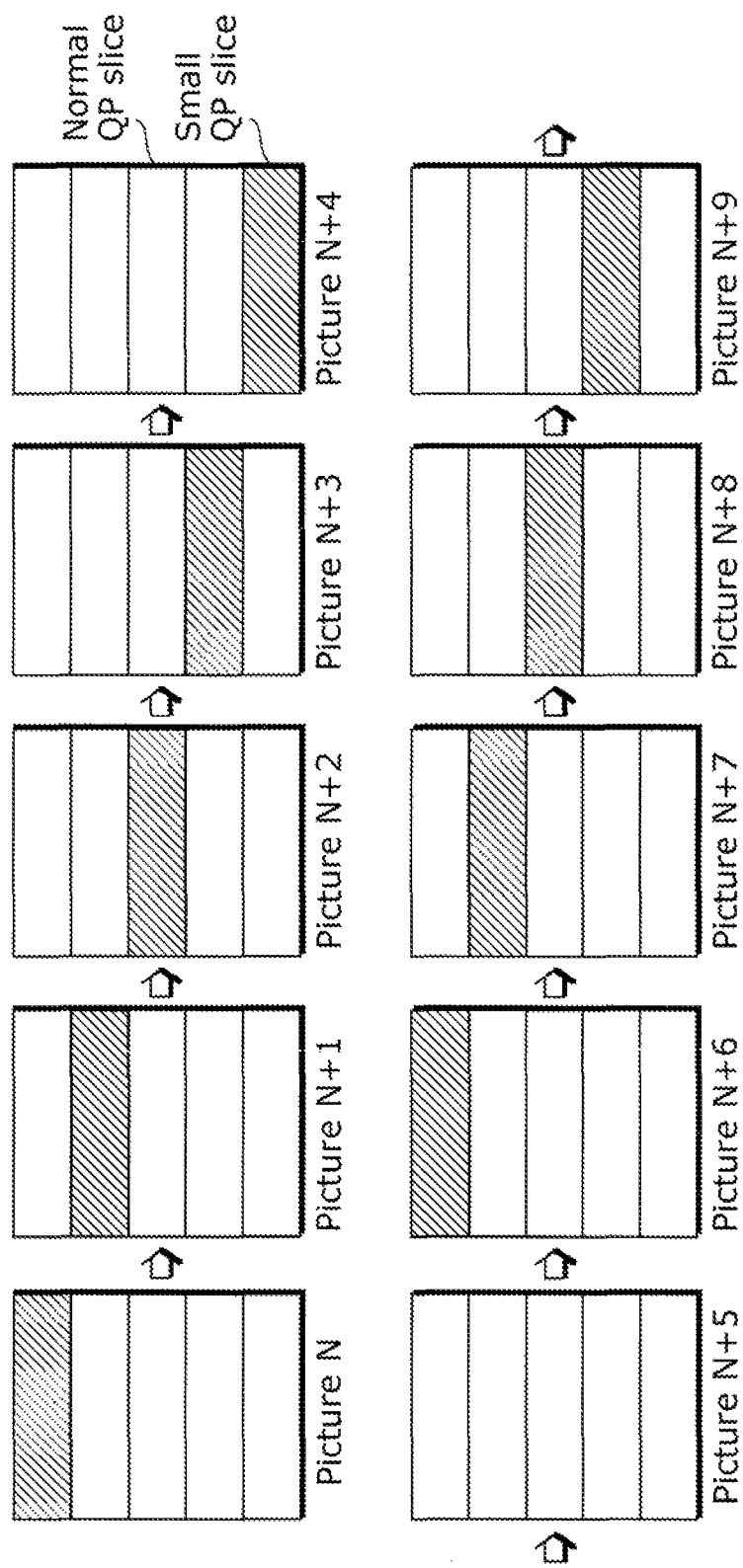
FIG. 1 is a diagram illustrating an example where small QP slices are inserted in temporally consecutive pictures according to Embodiment 1 of the present invention.

FIG. 1 is a diagram illustrating an example where small QP slices are inserted in temporally consecutive pictures according to Embodiment 1 of the present invention.

As shown in FIG. 1, pictures N to N+9 are temporally consecutive in the order of N to N+9. Each picture (one frame) includes a plurality of slices. Here, each picture consists of five slices.

Of slices included in pictures, the shaded slices are slices to which a quantization step smaller than normal are set (hereinafter, referred to as small QP slices). The other slices with no shades are slices to which a normal quantization step that is not made smaller are set (hereinafter, referred to as normal QP slices). Here, the normal quantization step refers to a quantization step derived in a normal way such that, when moving pictures are coded, the bit rate indicating the data amount per second is constant and the quantization step within a picture is approximately constant. The size of the quantization step for small QP slices and the size of the quantization step for normal QP slices may be different per picture.

In such a manner, the size of the quantization step within a picture is changed per slice, although only for a certain slice.

As shown in FIG. 1, in Embodiment 1, a small QP slice with a small quantization step is included within a picture among periodically or temporally consecutive pictures, and the position of the small QP slice within a picture shifts through the temporally consecutive pictures. More specifically, the position of the small QP slice within a picture shifts downward one by one in the order shown in the pictures N to N+4. The picture N+4 has the small QP slice at the bottom. The picture N+5 consists of only normal QP slices without any small QP slices. The picture N+6 has the small QP slice at the top. In such a manner, in FIG. 1, the position of the small QP slice within a picture shifts through each predetermined number of temporally consecutive pictures.

Figure 24:
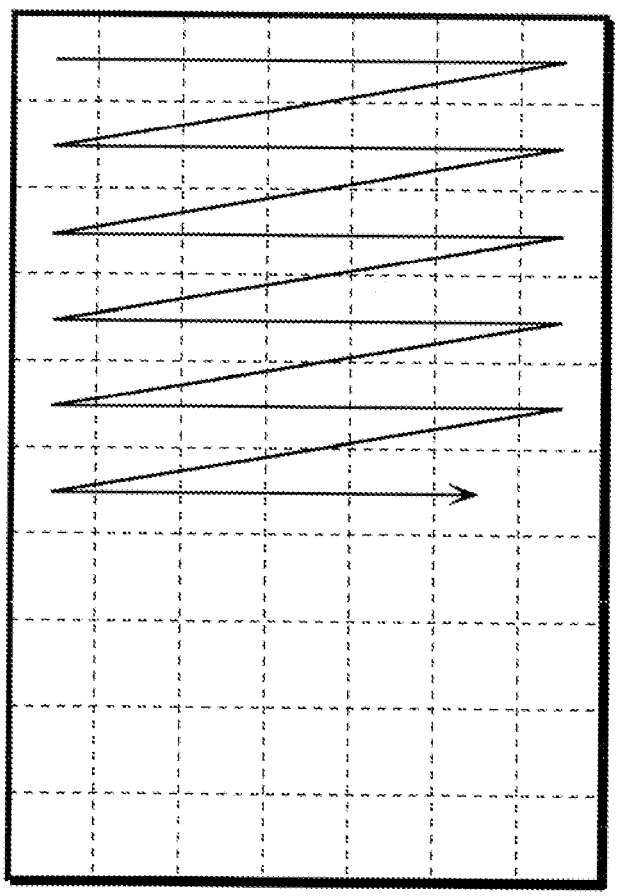
FIG. 24 is a diagram illustrating a coding order of blocks in a picture.

Here, as shown in FIG. 1, a fixed number of slices (blocks) are included between a small QP slice and a subsequent small QP slice in the coding order of blocks between the temporally consecutive pictures. Here, the coding order refers to the coding order of blocks within a picture shown in FIG. 24.

Of moving pictures today, not only in captured video of video conferencing, concerts, and security cameras, but also of movies and sceneries, there are not many portions with large motion in entire region of the moving pictures. In other words, in majority of the moving picture signals today, only some portions are in motion, or there is negligible motion in the entire region. In the portions with no motion, correlation between pictures are extremely high; and thus, there is almost no difference between a reference picture and a picture to be coded. When there is almost no difference, even if differences are not coded, coding distortion does not increase.

Therefore, in the inter-coding, in the case where a difference between a reference picture and a picture to be coded is coded relative to the portion with negligible motion, it is not necessary to code the difference between the pictures when the coding distortion in the reference picture is small. Thus, even when the quantization step of the picture to be coded is large, the coding distortion in the picture to be coded becomes smaller.

Figure 2:
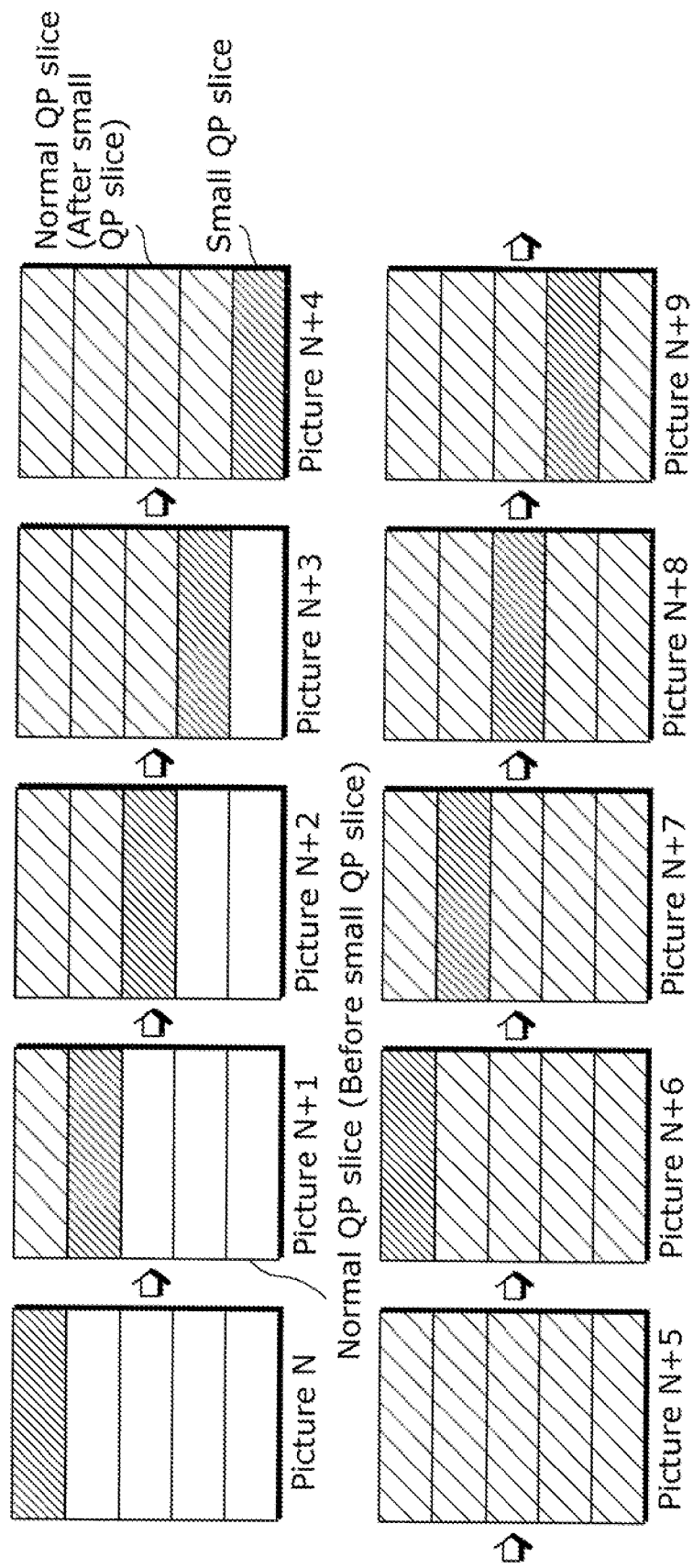
FIG. 2 is a diagram illustrating an advantageous effect according to Embodiment 1 of the present invention.

FIG. 2 is a diagram illustrating an advantageous effect according to Embodiment 1 of the present invention.

The coding distortion of the shaded small QP slices quantized with the small quantization step is smaller than that of the normal QP slices quantized with the normal quantization step. In other words, in the case where a small QP slice is predictive coded, compared to the case where a normal QP slice is predictive coded, a decoded picture with smaller difference from the original picture can be reproduced. Furthermore, in the case where a subsequent picture is coded as a normal QP slice with reference to the decoded picture, the difference between the original picture and the decoded picture also remains in the subsequent picture.

Therefore, in the portion with negligible motion, even when the quantization step is a normal size, a normal QP slice coded with reference to a small QP slice receives less influence of the coding distortion in a reference picture than a normal QP slice coded with reference to a normal QP slice; thereby the coding distortion in the normal QP slice coded with reference to a small QP slice is smaller.

With such reasons, coding with reference to a small QP slice allows the coding distortion in the normal QP slice to be smaller. Even when the quantization step is a normal size, the coding distortion of a normal QP slice is smaller in a further subsequent picture coded with a reference to a normal QP slice with smaller coding distortion than in a further subsequent picture coded with a reference to a normal QP slice with the cording distortion that is not made smaller.

Therefore, as shown in FIG. 2, in the temporally consecutive pictures, the slice at the position where a small QP slice was set in a picture at a given point have smaller coding distortion even in the subsequent pictures. More specifically, a small QP slice is included within a picture, and the position within a picture cyclically shifts in the coding order through the temporally consecutive pictures. As a result, the position of the small QP slice within a picture cyclically shifts in a predetermined cycle. Accordingly, coding with small coding distortion is performed in a predetermined cycle at each of the positions of the slices in pictures.

As described, in moving pictures with slight motion or negligible motion, the above described method allows the coding distortion to be smaller and visually less noticeable.

Figure 3A:
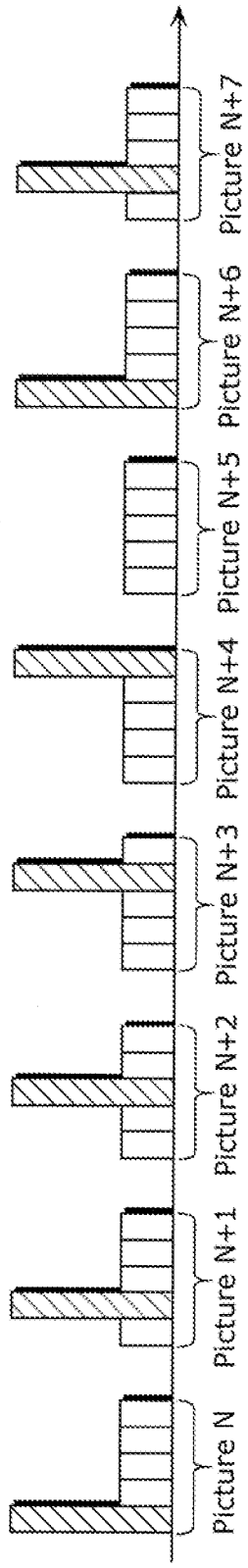
FIG. 3A is a diagram illustrating the number of bits in the case where each slice is coded and a stream is transmitted in time order according to Embodiment 1 of the present invention.
Figure 3B:
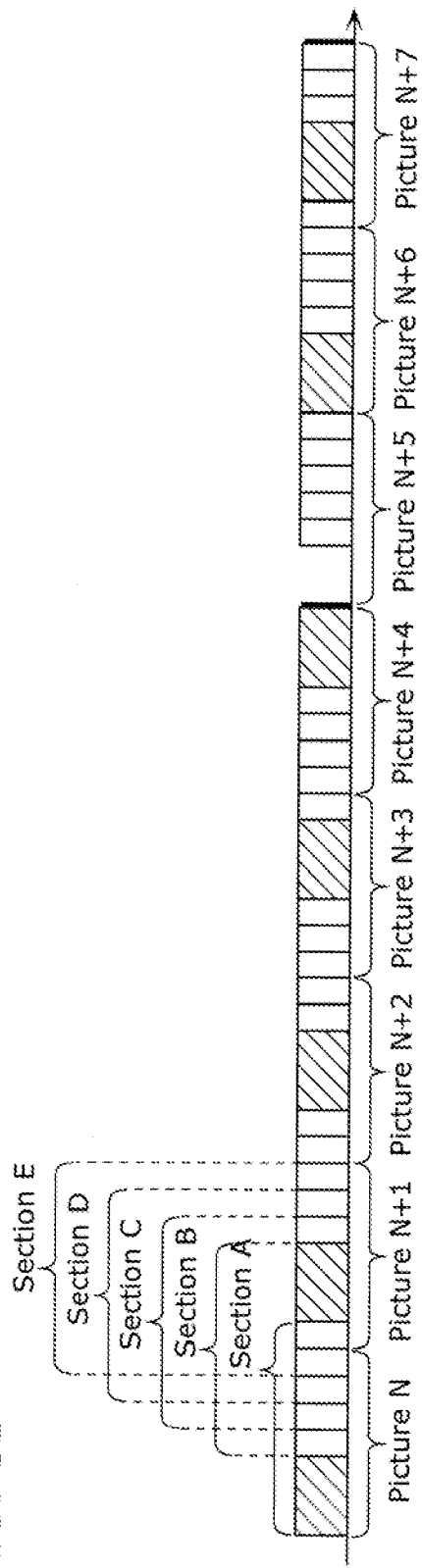
FIG. 3B is another diagram illustrating the number of bits in the case where each slice is coded and a stream is transmitted in time order according to Embodiment 1 of the present invention.

FIG. 3A and FIG. 3B are diagrams illustrating the number of bits in the case where each slice is coded and a stream is transmitted in time order according to Embodiment 1 of the present invention.

FIG. 3A illustrates the number of bits at the time of coding slices in a picture in the coding order. Here, in FIG. 3A, the horizontal axis represents the coding order (time) and the vertical axis represents the number of bits.

The compression rate of the small QP slice is lower than that of the other normal QP slices. Thus, in coding, the number of bits of the small QP slice is greater than that of the normal QP slice.

When transmitting the coded slices per slice at a constant bit rate, transmission of coded data of the small QP slice with the small quantization step takes longer than the other normal QP slices.

FIG. 3B is a diagram illustrating the transmission of coded data shown in FIG. 3A at a constant bit rate with the horizontal axis representing time axis. FIG. 3B illustrates a state where temporally consecutive pictures are coded and transmitted in the coding order at a constant bit rate.

As shown in FIG. 3A and FIG. 3B, between the pictures N+4 to N+6, there are also a fixed number of normal QP slices, here five slices, between a small QP slice and a subsequent small QP slice. In other words, in the case where a stream is transmitted over the network per slice, two consecutive small QP slices having large number of bits are not transmitted. Accordingly, the number of bits in the network transmission is averaged. More specifically, as shown in sections A to E in FIG. 3B, six slices in any of the sections, that is, each of consecutive six slices has one small QP slice and five normal QP slices.

Therefore, the number of slices between a small QP slice and a subsequent small QP slice is fixed, which results in averaging the number of bits in the network transmission. More specifically, the change of the number of bits of slices is periodic so that a control for transmitting each picture in a constant time is easily performed.

In FIG. 1 and FIG. 2, a picture subsequent to the picture having the small QP slice at the bottom (picture N+4) is the picture having no small QP slice (picture N+5). This allows averaging of the number of bits. If the number of bits does not need to be averaged, it is not necessary to insert a picture having no small QP slice (please refer to later described Embodiment 3).

Next, a moving picture coding device including a functional structure which achieves the above will be described.

Figure 4:
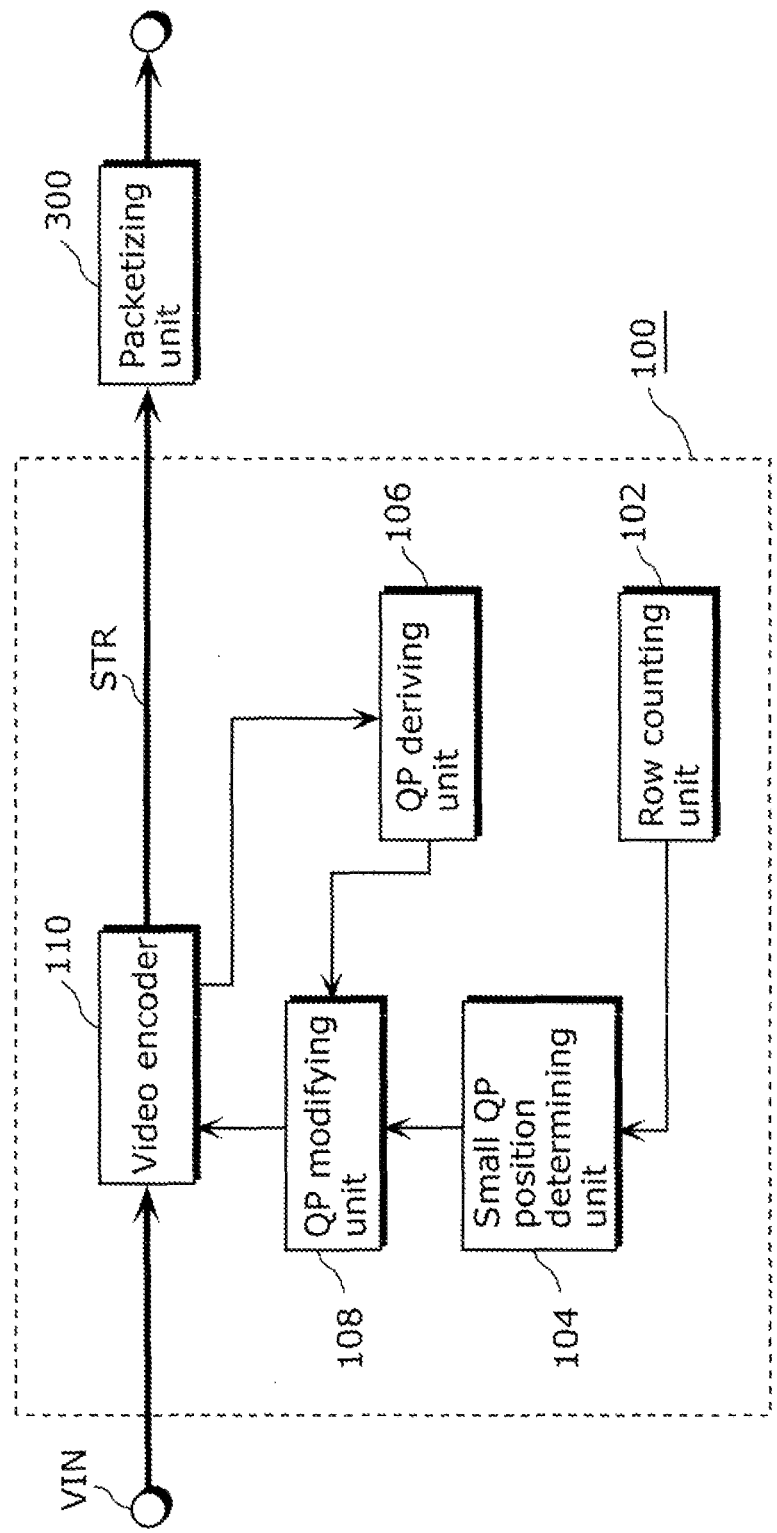
FIG. 4 is a block diagram illustrating a structure of a moving picture coding device according to Embodiment 1 of the present invention.

FIG. 4 is a block diagram illustrating a structure of a moving picture coding device according to Embodiment 1 of the present invention.

A moving picture coding device 100 includes: a row counting unit 102; a small QP position determining unit 104 which determines the position of a slice to which the quantization step smaller than normal (small quantization step) is set; a QP deriving unit 106 which derives normal quantization step; a QP modifying unit 108 which modifies the normal quantization step; and a vide encoder 110.

The row counting unit 102 counts the number of rows of the slices to be coded by the video encoder 110.

The small QP position determining unit 104 determines, based on the number of rows notified from the row counting unit 102, whether the quantization step used for coding the slices to be coded by the video encoder 110 is to be set to a normal size (normal quantization step) or to a size smaller than the normal size (small quantization step).

The QP deriving unit 106 derives the normal quantization step of the slices to be coded by the video encoder 110, based on the number of bits of the slices previously coded by the video encoder 110. The slices coded with the quantization step derived here are the normal QP slices.

In the case where the normal quantization step is derived, in general, the quantization step size is slightly increased when the number of bits at the time of actual coding is greater than the transmission bit rate. On the other hand, when the number of bits at the time of actual coding is smaller than the transmission bit rate, the quantization step size is slightly decreased.

In such a manner, the QP deriving unit 106 derives the normal quantization step by making a slight adjustment such that the number of bits at the time of coding the slices to be coded by the video encoder 11 matches the transmission bit rate.

The quantization step may be changed per slice or per block.

The QP modifying unit 108 modifies the normal quantization step derived by the QP deriving unit 106 to be smaller, in the case where the small QP position determining unit 104 determines that the slices are the small QP slices to which the quantization step smaller than the normal quantization step is set. The QP modifying unit 108 notifies the video encoder 110 to code the target slices with the quantization step modified to be smaller.

The QP modifying unit 108 notifies the video encoder 110 to code the target slices with the normal quantization step derived by the QP deriving unit 106, in the case where the small QP position determining unit 104 determines that the slices are not the small QP slices to which the quantization step smaller than the normal quantization step is set.

Here, the degree of modification (reduction) of the normal quantization step size derived by the QP deriving unit 106 is a fixed value. Examples of easily-implementable methods for modifying the normal quantization step are subtracting a constant number from the value of the normal quantization step, and multiplying the value of the normal quantization step by a constant number.

In addition, a method is also effective where a predetermined minimum value is clopped such that the small quantization step modified by the QP modifying unit 108 does not become too small, that is, does not become smaller than a predetermined value. Of course, this method may be applied in addition to the above methods of subtraction or multiplication.

The video encoder 110 codes (intra-codes or inter-codes) input picture VIN per block, using the quantization step notified by the QP modifying unit 108.

The video encoder 110 outputs, to a packetizing unit 300, the coded input picture VIN as a stream STR.

The packetizing unit 300 converts the stream STR into a format suitable for the network transmission. For example, the packetizing unit 300 converts the stream STR into a unit of network transmission per slice. Here, the packetizing unit 300 may convert a slice in the stream STR into units of network transmission.

The moving picture coding device 100 is thus structured.

Next, coding processing performed by the moving picture coding device 100 will be described.

It is preferable that the QP deriving unit 106 derives the normal quantization step such that the number of bits is constant per a few slices or per picture. The reason is that even if the large number of bits occurs in the slices whose quantization step is modified to the small quantization step by the QP modifying unit 108, image quality degradation is prevented by suddenly increasing the normal quantization step size of the immediately subsequent slice to be coded.

Figure 5:
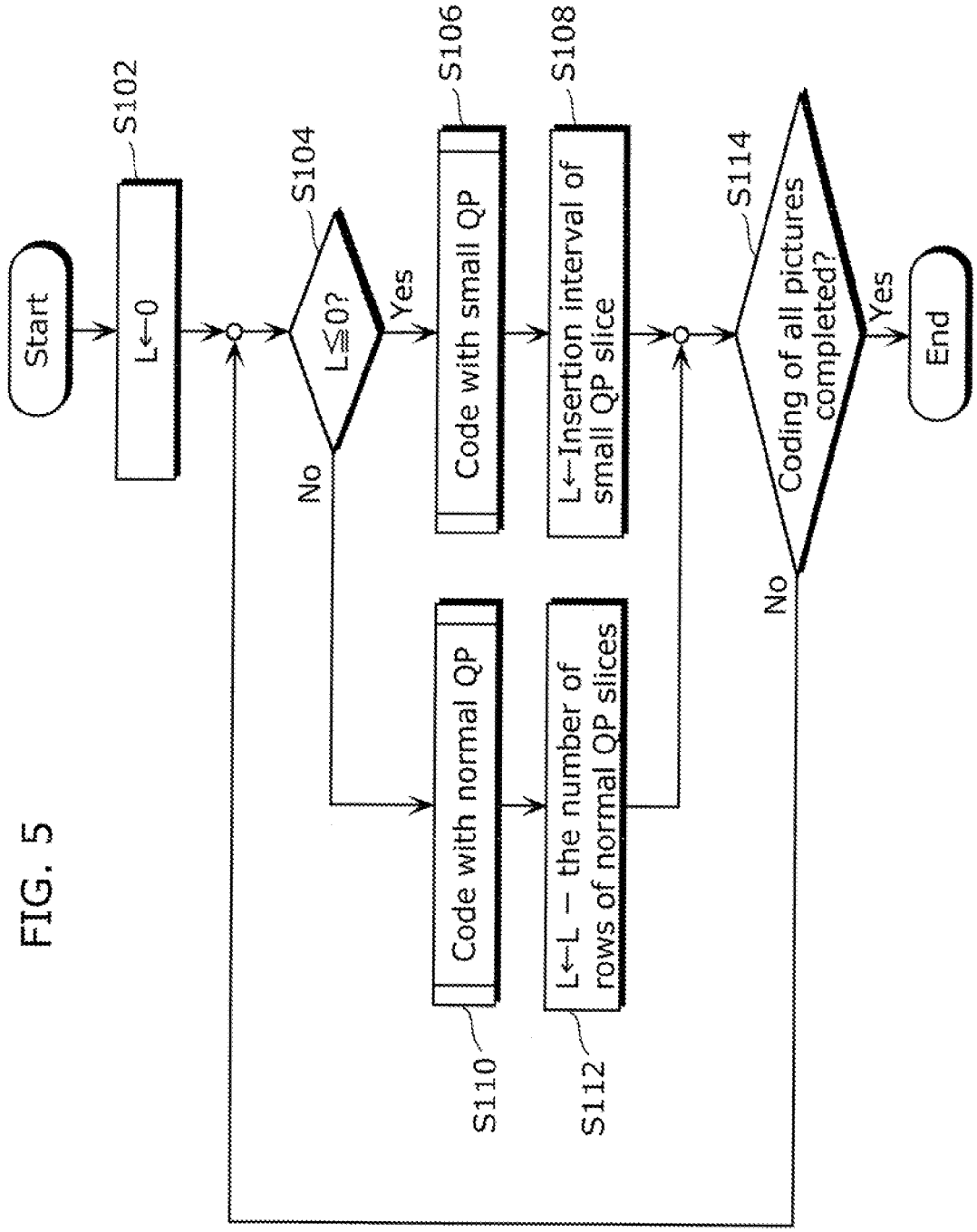
FIG. 5 is a flowchart of coding processing performed by the moving picture coding device according to Embodiment 1 of the present invention.

FIG. 5 is a flowchart of coding processing performed by the moving picture coding device according to Embodiment 1 of the present invention.

First, the row counting unit 102 initializes counter L to 0. The counter L is a value indicating the number of rows of the slices to be coded by the video encoder 110.

Next, the small QP position determining unit 104 determines whether the quantization step used at the time of coding the slices to be coded by the video encoder 110 is set to be the normal quantization step or the small quantization step.

More particularly, first, the small QP position determining unit 104 determines whether the counter L is equal to or smaller than 0 (S104).

Next, the small QP position determining unit 104 determines, when the counter L is equal to or smaller than 0 (Yes in S104), the quantization step used at the time of coding the slices to be coded by the video encoder 110 to be the small quantization step smaller than the normal quantization step. The video encoder 110 codes the target slices using the small quantization step determined by the small QP position determining unit 104 (S106).

In the case where the video encoder 110 codes the slices using the small quantization step determined by the small QP position determining unit 104, the row counting unit 102 assigns, to the counter L, an insertion interval of small QP slices in consecutive pictures (S108). Here, the insertion interval of small QP slices refers to a (total) value of the number of rows of the normal QP slices inserted between a small QP slice and a subsequent small QP slice within or between temporally consecutive pictures.

Next, the small QP position determining unit 104 checks if the video encoder 110 completed coding of all pictures (S114).

The small QP position determining unit 104 determines, when the counter L is greater than 0 (No in S104), the quantization step used at the time of coding the slices to be coded by the video encoder 110 to be the normal quantization step. The video encoder 110 codes the target slices using the normal quantization step determined by the small QP position determining unit 104 (S110).

In the case where the video encoder 110 codes the slices using the normal quantization step determined by the small QP position determining unit 104, the row counting unit 102 subtracts, from the counter L, the number of rows of the normal QP slices coded by the video encoder 110.

Next, the small QP position determining unit 104 checks if the video encoder 110 completed coding of all pictures (S114). When not completed (No in S114), the processing of S104 to S114 is repeated till all pictures are coded.

In such a manner, the moving picture coding device 110 according to Embodiment 1 performs coding and is capable of inserting a certain number of slices between a small QP slice and a subsequent small QP slice, between consecutive pictures.

As described, in moving pictures with slight motion or negligible motion, coding distortion is likely to be noticeable compared to moving images with large motion, because pictures with slight motion or negligible motion are easily be tracked by eyes. However, as the coding distortion of a slice used for pixel correlation (a reference slice) is smaller, the coding distortion also decreases even in the moving pictures with slight motion or negligible motion.

Accordingly, according to Embodiment 1, a small QP slice to be coded with the quantization step smaller than normal is included within a picture and the position of the small QP slice within a picture cyclically shifts in the coding order per a certain number of temporally consecutive pictures. In this way, the position of the small QP slice within a picture cyclically shifts through the consecutive pictures in a predetermined cycle. As a result, at each of the slice positions within pictures, coding with small coding distortion is performed in a predetermined cycle. This allows reduced coding distortion in moving pictures with slight motion or negligible motion, thereby making the coding distortion visually less noticeable.

By reducing the quantization step size of only some of the slices within a picture, the number of bits at the time of coding each picture becomes approximately constant. As a result, it is possible to perform transmission over the network at a constant bit rate.

It has been described that the degree of the modification from the normal quantization step to the small quantization step is a fixed value; however, it is not limited to the example. For example, the value of the small quantization step may be predetermined, or the value of half of the derived normal quantization step may be set to the m small quantization step. Furthermore, the value of the small quantization step may be variable depending on the bit rate.

(Embodiment 2)

Next, Embodiment 2 is described. The description of the same structure and operations as those of Embodiment 1 will be omitted.

Figure 6:
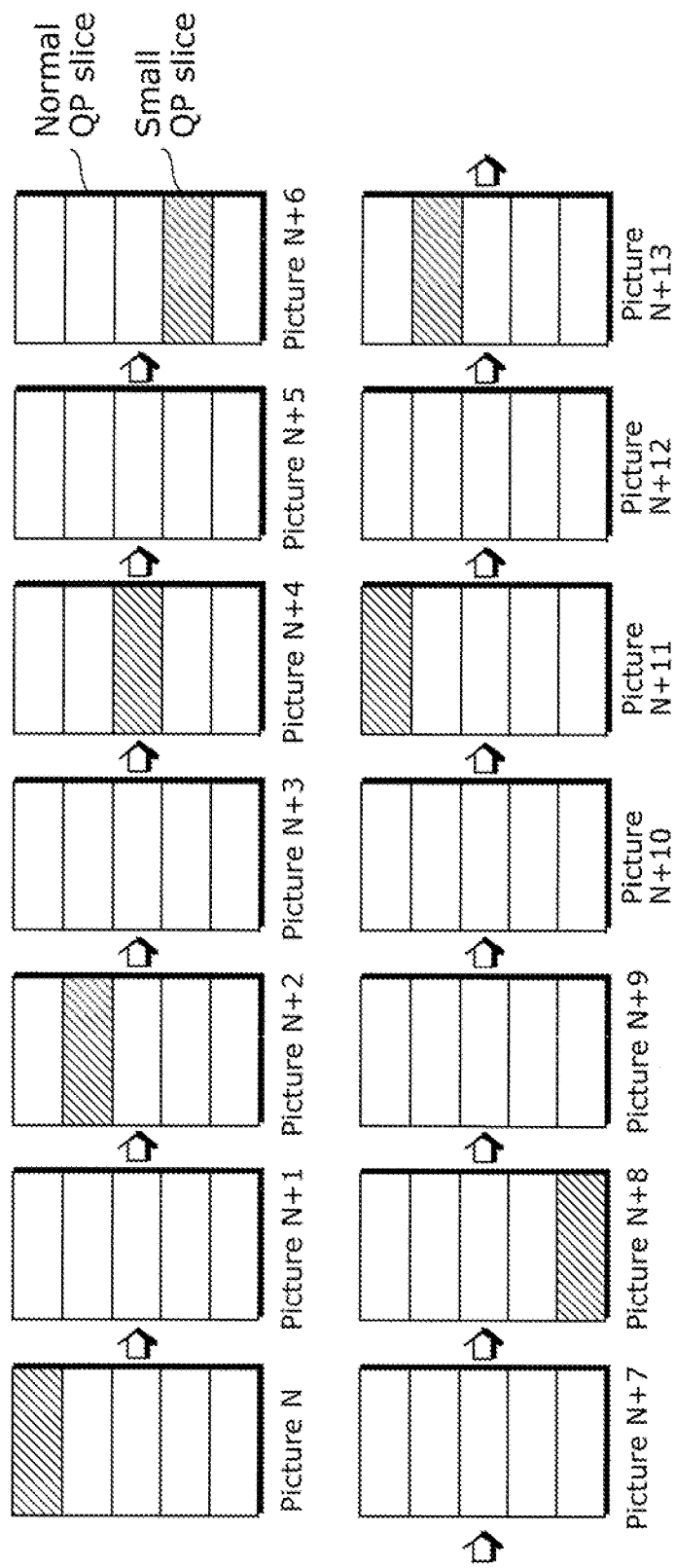
FIG. 6 is a diagram illustrating an example where small QP slices are inserted in temporally consecutive pictures according to Embodiment 2 of the present invention.

FIG. 6 is a diagram illustrating an example where small QP slices are inserted in temporally consecutive pictures according to Embodiment 2 of the present invention. Here, the shaded slices are small QP slices, and the other slices are normal QP slices.

FIG. 6 differs from FIG. 1 in that a picture having no small QP slice with the quantization step smaller than normal is inserted at regular intervals (periodically). More specifically, in the example shown in FIG. 6, in a predetermined cycle of temporally consecutive pictures (pictures N to N+10), a picture having no small QP slice is inserted in every other picture in the example shown in FIG. 1 (pictures N to N+5 in FIG. 1). Accordingly, as shown in FIG. 6, in a predetermined cycle of the temporally consecutive pictures, a picture having no QP slice is inserted as picture N+1, picture N+3, picture N+5, picture N+7, picture N+9, and picture N+10.

By inserting a small QP slice into a picture consisting of normal QP slices, the number of bits of the picture slightly increases compared to a picture consisting of only normal QP slices. Thus, in the case where transmission at a low bit rate is necessary, by inserting a picture having no small QP slice (a picture consisting of only normal QP slices) periodically, it is possible to reduce the increase in the average bit rate per several frames. It is also possible to reduce the coding distortion caused due to the insertion of the small QP slice.

However, in the case where a picture having no small QP slice is inserted periodically, the number of pictures required for the position of the small QP slice within a picture returning to the same position (eleven pictures from pictures N to N+10) increases compared to the number of pictures in the case of FIG. 1 (seven pictures from pictures N to N+6). Thus, for example, when moving pictures with slight motion are decoded, as is clear from the comparison between FIG. 6 and FIG. 1, there is an increase in the time period (a predetermined cycle) required before coding distortion in the entire pictures is decreased.

(Embodiment 3)

Next, Embodiment 3 is described. The description of the same structure and operations as those of Embodiment 1 will be omitted.

Figure 7:
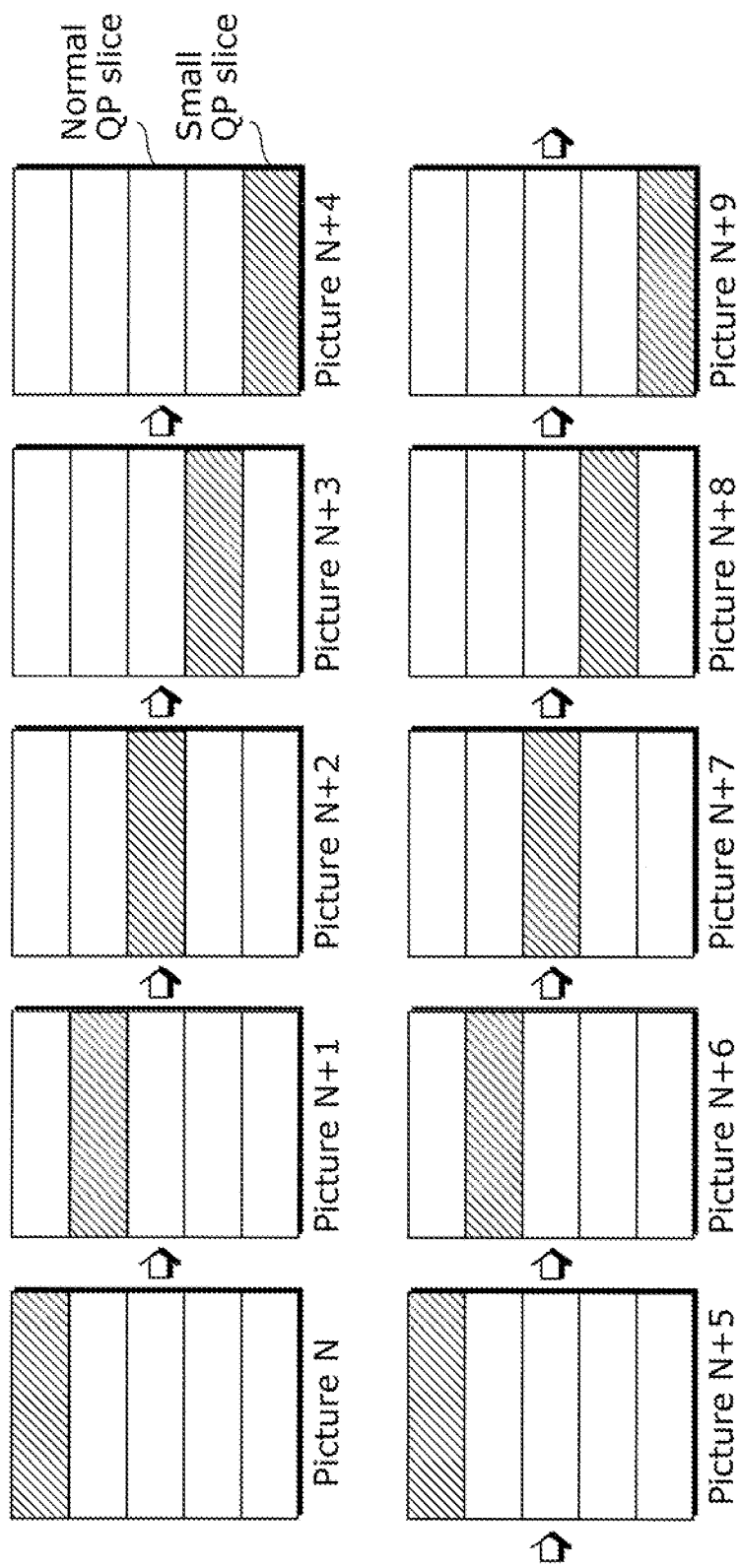
FIG. 7 is a diagram illustrating an example where small QP slices are inserted in temporally consecutive pictures according to Embodiment 3 of the present invention.

FIG. 7 is a diagram illustrating an example where small QP slices are inserted in temporally consecutive pictures according to Embodiment 3 of the present invention. Here, the shaded slices are small QP slices, and the other slices are normal QP slices.

FIG. 7 differs from FIG. 1 in that a picture having no small QP slice is not inserted. More specifically, in the example shown in FIG. 7, in the temporally consecutive pictures (pictures N to N+9), a picture having no small QP slice is not inserted; and thus, each of the pictures (pictures N to N+9) includes a small QP slice.

Therefore, immediately after the coding of the small QP slice in the picture N+4 (the slice at the bottom of the picture) in FIG. 7, the small QP slice in the picture N+5 (the slice at the top of the picture) is coded and transmitted over the network. This results in consecutive slices having large number of bits.

In the case where transmission over the network is performed per picture, unlike Embodiment 1 where coding and transmission are performed per slice, it is efficient to set the constant number of bits per picture.

Accordingly, in the case where transmission over the network is performed per picture, it may be that the moving picture coding device 100 adjusts the quantization step such that each of the io temporally consecutive pictures includes a small QP slice as shown in FIG. 7, unlike the case where the small QP slice is inserted at a constant interval as shown in FIG. 1.

(Embodiment 4)

Next, Embodiment 4 is described. The descriptions of the same structure and operations as those of Embodiment 1 will be omitted.

In Embodiments 1 to 3, the example case has been described where the moving picture coding device 100 sets the quantization step to be smaller than normal per slice, so that the coding distortion is visually less noticeable even in the moving pictures with slight motion or negligible motion. In Embodiment 4, an example is shown where the quantization step is set to be smaller than normal per block instead of per slice. By setting the small quantization step per block, it is possible to change the number of blocks to which the small quantization step is set, independently of the size of the slices. In the following, a small QP block refers to a block consisting of a certain number of blocks to be coded with reference to a quantization step (small quantization step) smaller than normal quantization step in each picture, independently of the slice structure.

Figure 8:
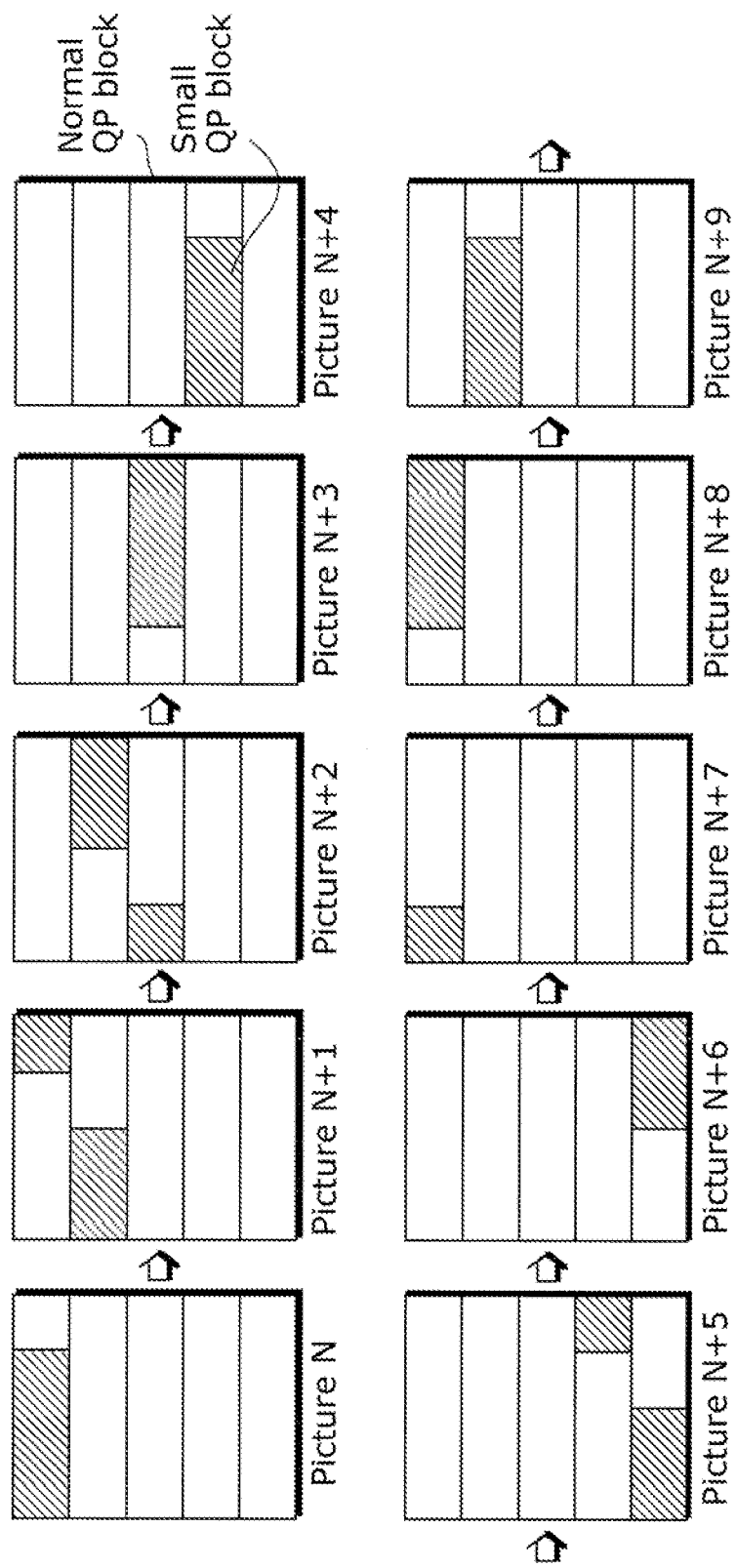
FIG. 8 is a diagram illustrating an example where small QP blocks are inserted in temporally consecutive pictures according to Embodiment 4 of the present invention.

FIG. 8 is a diagram illustrating an example where small QP blocks are inserted in temporally consecutive pictures according to Embodiment 4 of the present invention. Here, the shaded areas are small QP blocks, and the other slices or areas (blocks) are either normal QP slices or areas (blocks) to be coded with a normal quantization step.

As shown in FIG. 8, the position of the small QP block shifts in the direction of the coding order through temporally consecutive pictures. In other words, the position of the small QP block shifts per each small QP block (for each predetermined number of blocks) within a picture staring from the picture N. In this way, the position of the small QP block shifts independently of the slice structure. The small QP block may be continuous across two slices as shown in the picture N+1, for example. It is sufficient that each small QP block consists of a certain number of blocks in the coding order; and thus, as shown in the pictures N+6 and N+7, the small QP block may be continuous across two pictures.

As described, in the case where a coding device can be employed which can change the quantization step per block instead of per slice, it is preferable that the position of the small QP block within a picture shifts through the temporally consecutive pictures, as shown in FIG. 8 in Embodiment 4.

Next, a moving picture coding device including a functional structure which achieves the above will be described.

Figure 9:
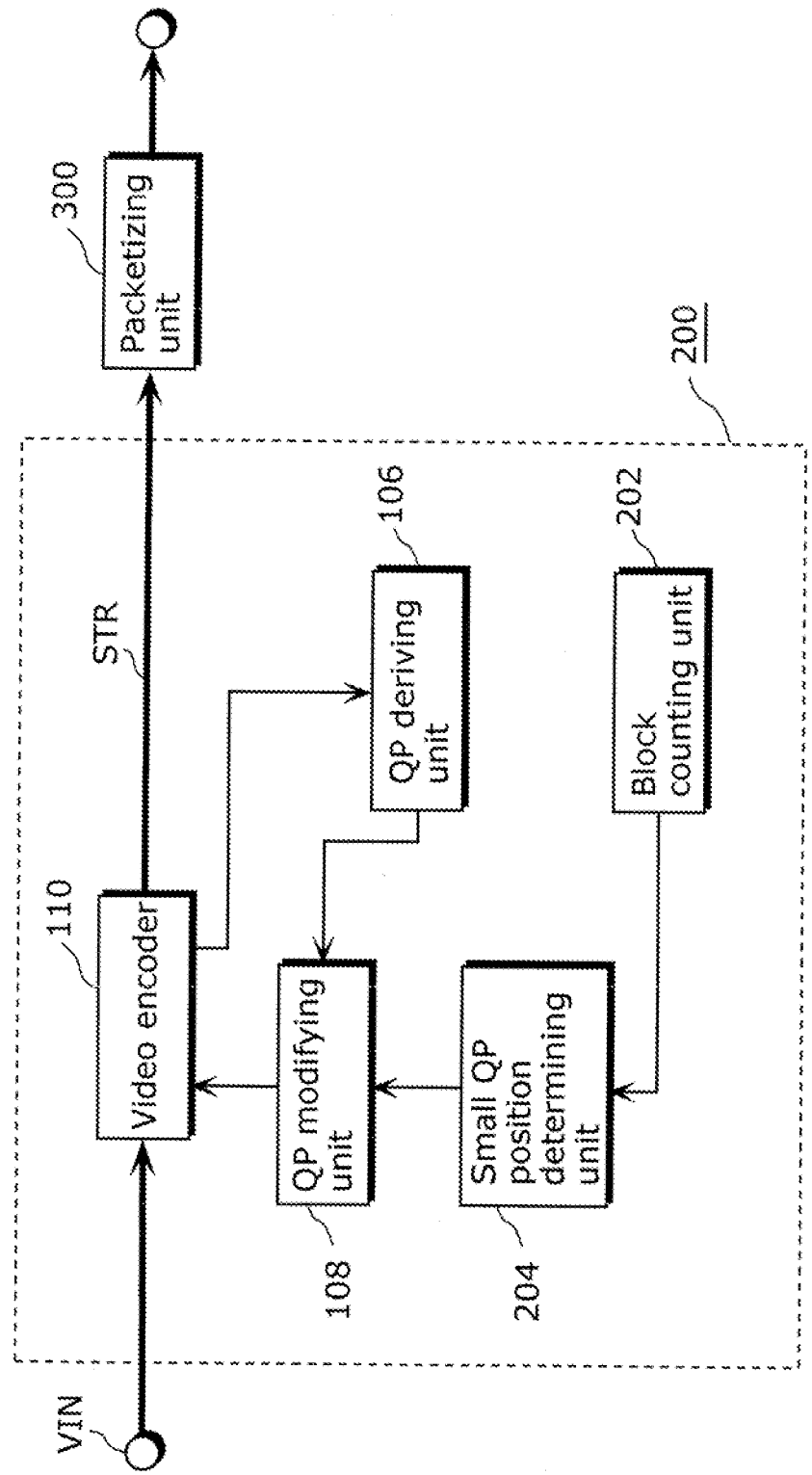
FIG. 9 is a block diagram illustrating a structure of a moving picture coding device according to Embodiment 4 of the present invention.

FIG. 9 is a block diagram illustrating a structure of a moving picture coding device according to Embodiment 4 of the present invention. The same numerals are used for the same elements as in FIG. 5, and thus the detailed description will be omitted.

A moving picture coding device 200 includes: a block counting unit 202; a small QP position determining unit 204 which determines the position of the block to which a quantization step smaller than normal (small quantization step) is set; a QP deriving unit 106 which derives normal quantization step; a QP modifying unit 108 which modifies the normal quantization step; and a video encoder 110.

The moving picture coding device 200 shown in FIG. 9 differs from the moving picture coding device 100 shown in FIG. 4 in the structures of the small QP position determining unit 104 and the row counting unit 102.

More specifically, in the moving picture coding device 200, the block counting unit 202 counts the number of blocks instead of the number of rows of the slices. The small QP position determining unit 204 determines the blocks to which the small quantization step is set, based on the counted number of blocks.

In addition, the quantization step is changed not per slice, but per block. Other than this point, the structures are the same as those described in FIG. 5; and thus, their descriptions are omitted.

The moving picture coding device 200 is thus structured.

It is preferable that the QP deriving unit 106 derives the normal quantization step such that the number of bits is constant per a few slices or per picture. The reason is that even if a large number of bits occurs in the blocks whose quantization step is modified to be small quantization step by the QP modifying unit 108, image quality degradation is prevented by suddenly increasing the normal quantization step size for the immediately subsequent block to be coded.

Next, coding processing performed by the moving picture coding device 200 will be described.

Figure 10:
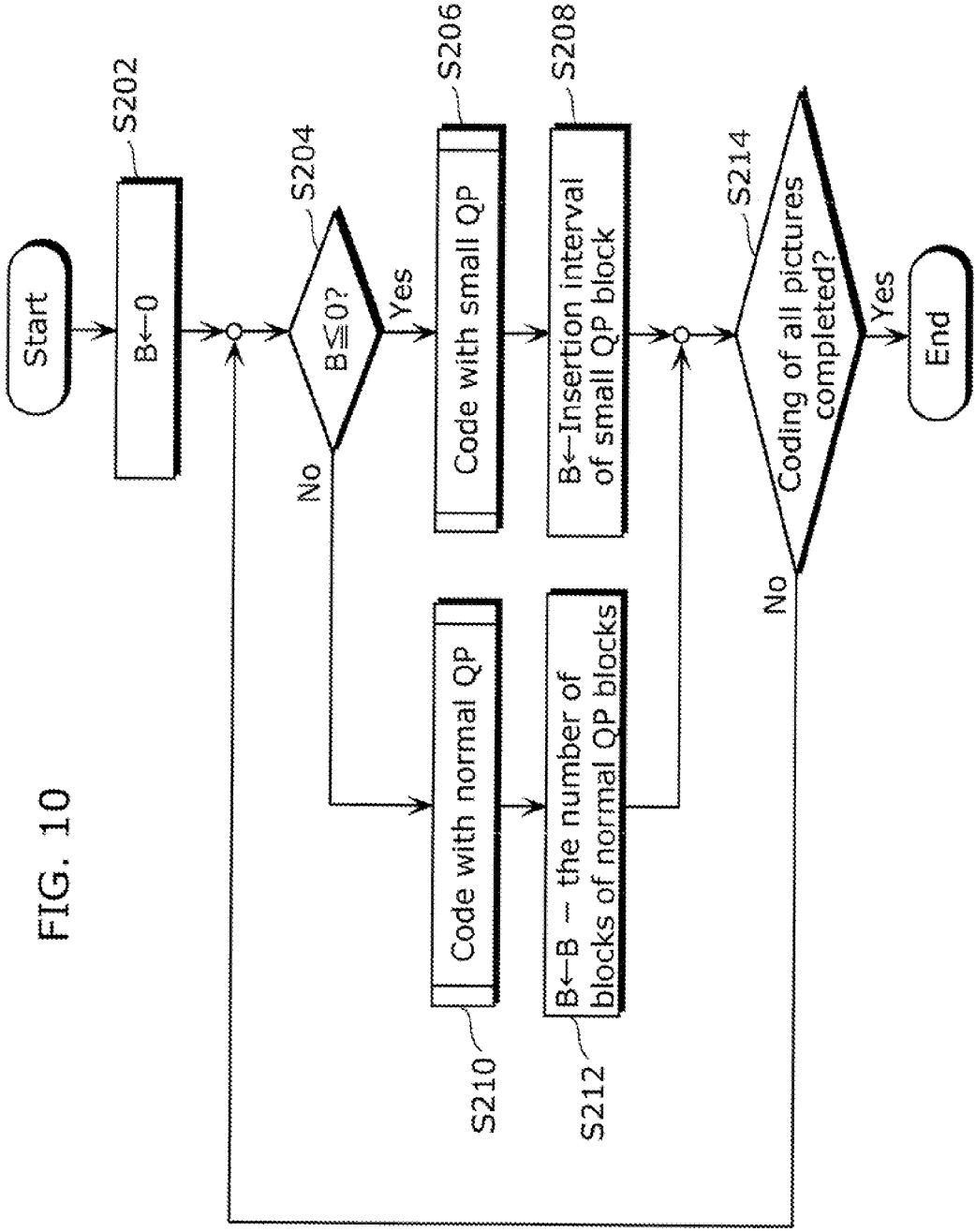
FIG. 10 is a flowchart of coding processing performed by the moving picture coding device according to Embodiment 4 of the present invention.

FIG. 10 is a flowchart of coding processing performed by the moving picture coding device according to Embodiment 4 of the present invention.

First, the block counting unit 202 initializes counter B to 0 (S202). The counter B is a value indicating the number of blocks to be coded by the video encoder 110.

Next, the small QP position determining unit 204 determines whether the quantization step used at the time of coding the blocks to be coded by the video encoder 110 is set to be a normal quantization step or a small quantization step.

More specifically, first, the small QP position determining unit 204 determines whether the counter B is equal to or smaller than 0 (S204).

Next, in the case where the counter B is equal to or smaller than 0 (Yes in S204), the small QP position determining unit 204 determines the quantization step used at the time of coding the target blocks by the video encoder 110 to be the quantization step smaller than a normal quantization step. The video encoder 110 codes the target blocks using the small quantization step determined by the small QP position determining unit 204 (S206).

In the case where the video encoder 110 codes the blocks with the small quantization step determined by the small QP position determining unit 204, the block counting unit 202 assigns, to the counter B, the insertion interval of the small QP blocks in the consecutive pictures (S208). Here, the insertion interval of the small QP blocks refers to a (total) value of the number of blocks inserted between a small QP block and a subsequent QP block within or between the temporally consecutive pictures.

Next, the small QP position determining unit 204 checks if the video encoder 110 completed coding of all pictures (S214).

The small QP position determining unit 204 determines, when the counter B is greater than 0 (No in S204), the quantization step used at the time of coding the target blocks by the video encoder 110 to be the normal quantization step. The video encoder 110 codes the target blocks using the normal quantization step determined by the small QP position determining unit 204 (S210).

In the case where the video encoder 110 codes the blocks using the normal quantization step determined by the small QP position determining unit 204, the block counting unit 202 subtracts, from the counter B, the number of blocks coded by the vide encoder 110 (S212).

Next, the small QP position determining unit 204 checks if the video encoder 110 completed coding of all pictures (S214). When not completed (No in S214), the processing of S204 to S214 is repeated till all pictures are coded.

In such a manner, the moving picture coding device 200 according to Embodiment 4 performs coding and be capable of inserting a certain number of blocks between a small QP block and a subsequent small QP block, between consecutive pictures.

(Embodiment 5)

Next, Embodiment 5 is described. The descriptions of the same structure and operations as those of Embodiment 1 to 4 will be omitted.

Figure 11:
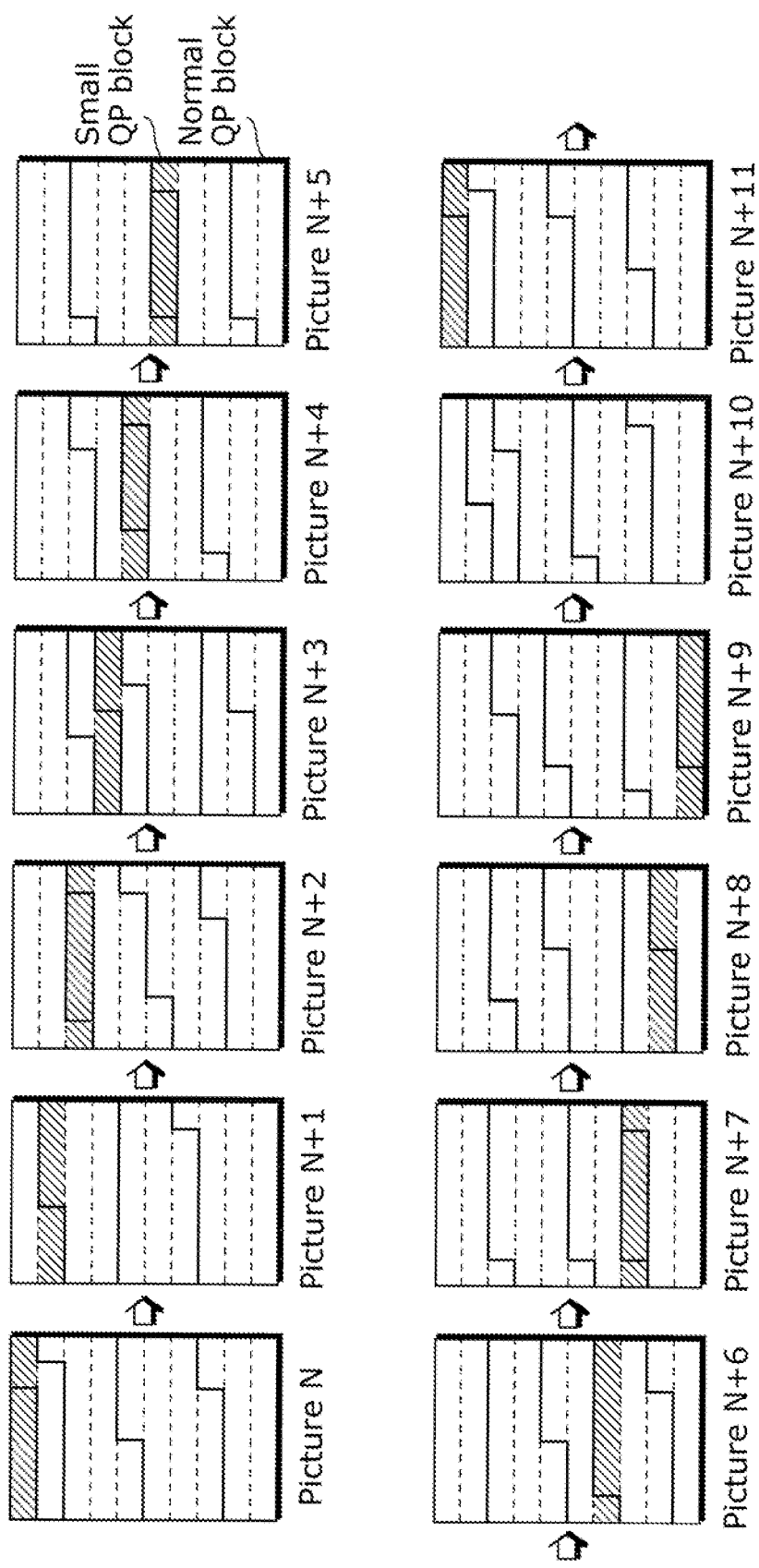
FIG. 11 is a diagram illustrating an example where small QP blocks are inserted in temporally consecutive pictures according to Embodiment 5 of the present invention.

FIG. 11 is a diagram illustrating an example where small QP blocks are inserted in temporally consecutive pictures according to Embodiment 5 of the present invention. Here, the shaded areas are small QP blocks. The area surrounded by solid lines are slices.

In Embodiments 1 to 4, slices included in each picture are on a row basis. However, as shown in FIG. 11, each of the slices within a picture may exist within multiple rows, and the border of the slices may be in the middle of a row. The size of the slices included in pictures may be changed depending on the content of the pictures to be coded.

For example, in the case where compression is difficult because of a large number of minute patterns in pictures, the number of blocks included in each slice in a picture is reduced. In the case where compression can be easily performed because of a flat pattern, the number of blocks included in each slice is increased. In this way, the number of bits per slice within a picture can be approximately constant.

Figure 12:
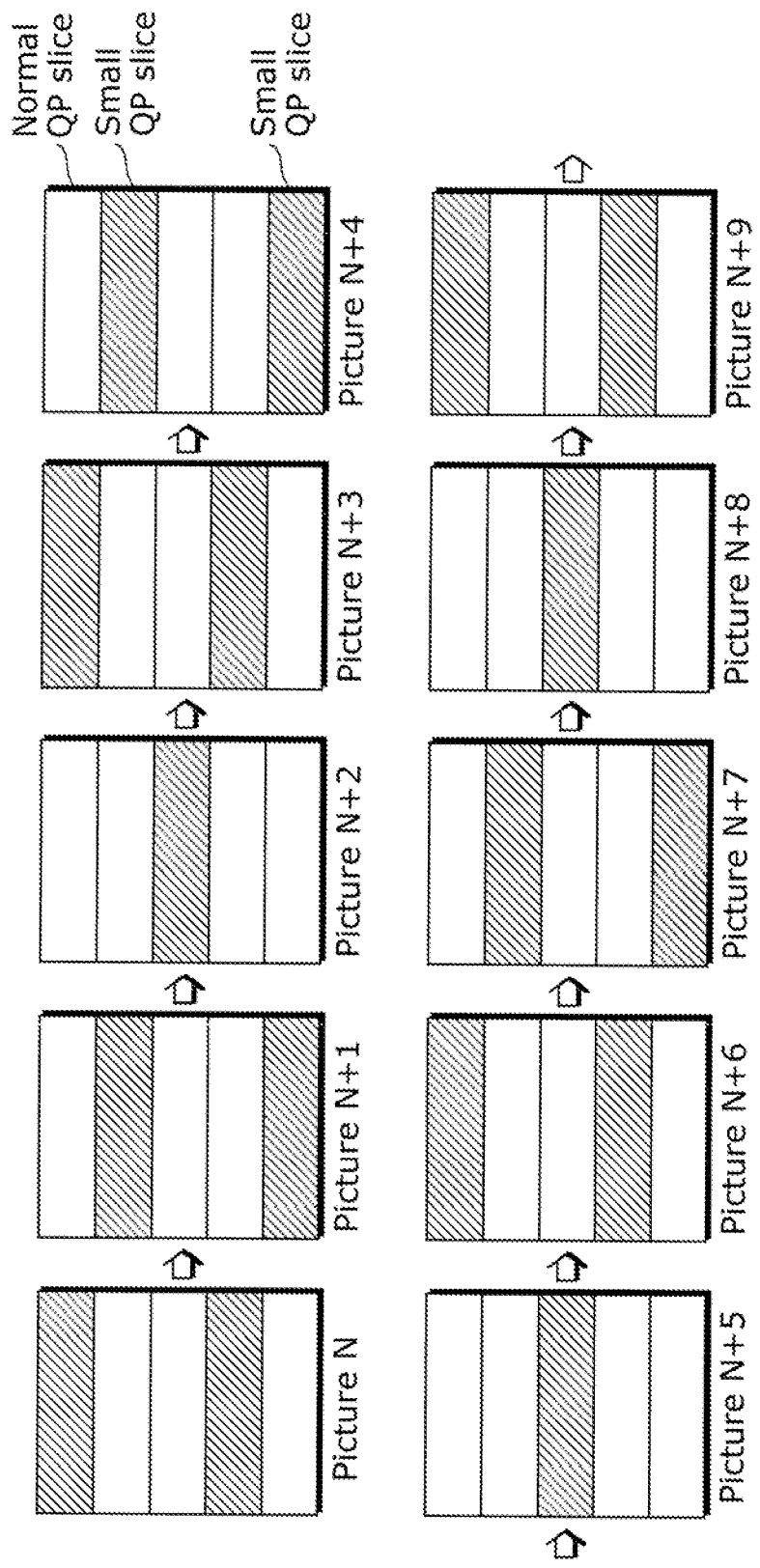
FIG. 12 is a diagram illustrating another example where small QP slices are inserted in temporally consecutive pictures according to Embodiment 5 of the present invention.

FIG. 12 is a diagram illustrating another example where small QP slices are inserted in temporally consecutive pictures according to Embodiment 5 of the present invention. Here, the shaded slices are small QP slices, and the other slices are normal QP slices.

The small QP slice insertion scheme in FIG. 12 differs from the small QP slice insertion scheme in FIG. 1 in that two small QP slices, instead of one small QP slice, are included in each of the temporally consecutive pictures.

FIG. 12 illustrates an example where small QP slices are arranged such that two normal QP slices are included between a small QP slice and a subsequent small QP slice. Even in this case, by fixing the number of normal QP slices between a small QP slice and a subsequent small QP slice, between temporally consecutive pictures, the number of bits in the network transmission can be averaged, thereby providing the same advantageous effects as those of Embodiment 1.

Figure 13:
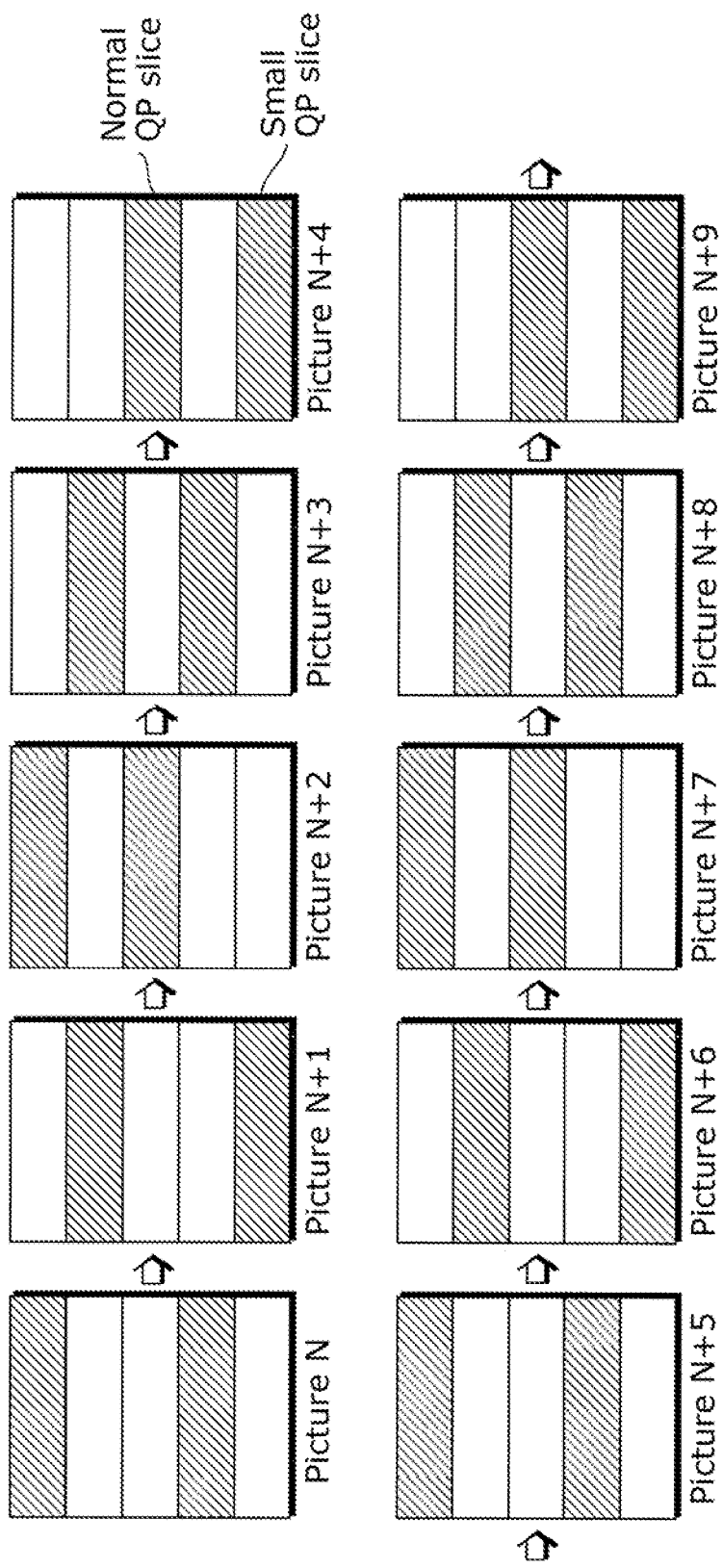
FIG. 13 is a diagram illustrating yet another example where small QP slices are inserted in temporally consecutive pictures according to Embodiment 5 of the present invention.
Figure 14:
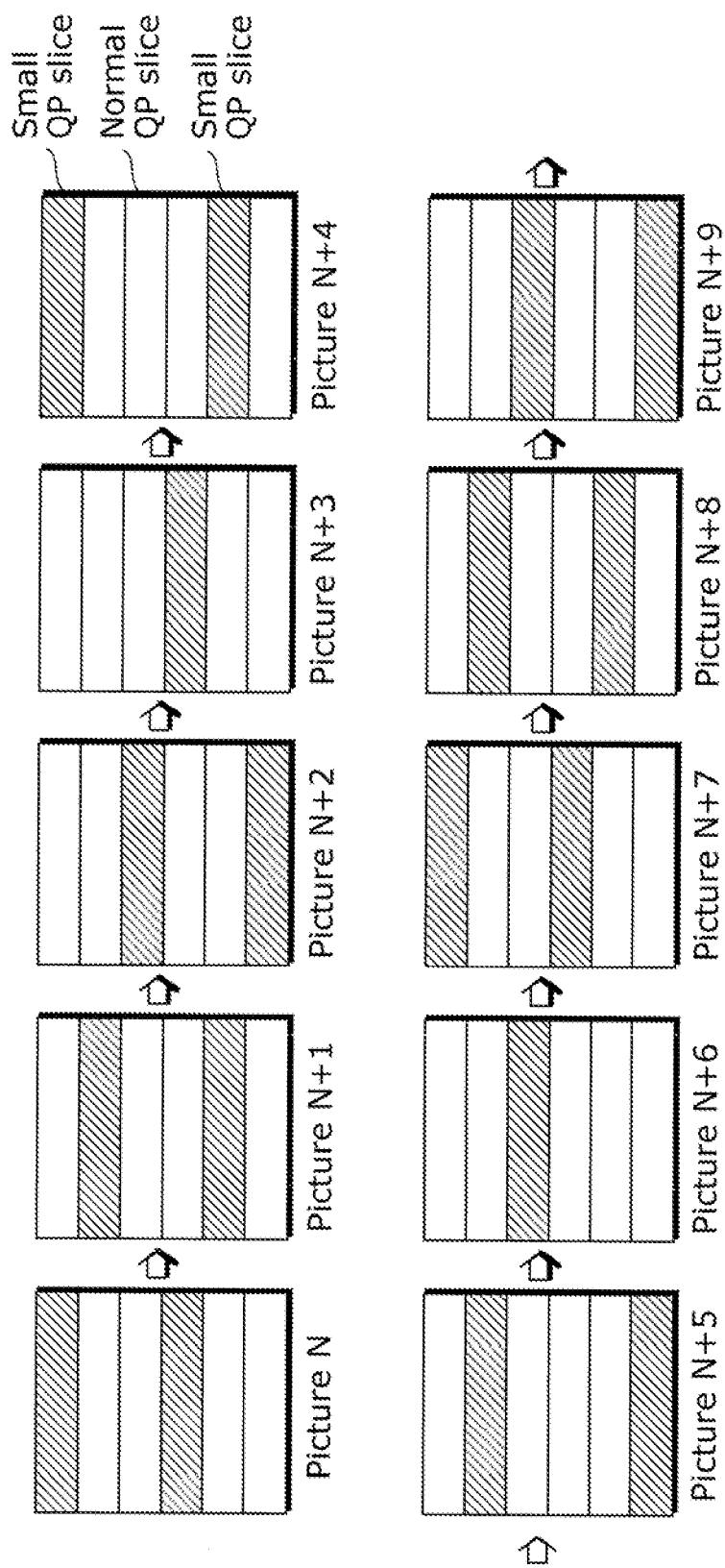
FIG. 14 is a diagram illustrating yet another example where small QP slices are inserted in temporally consecutive pictures according to Embodiment 5 of the present invention.
Figure 15:
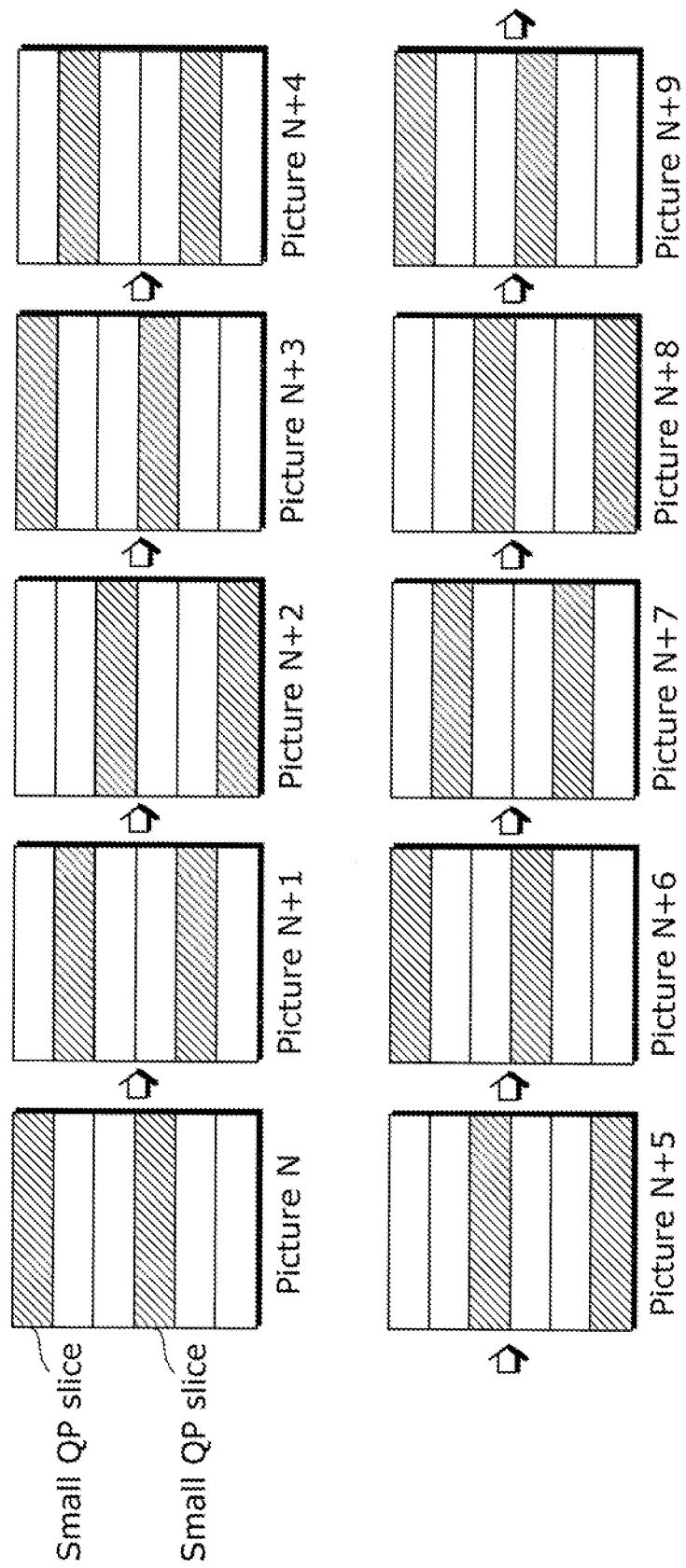
FIG. 15 is a diagram illustrating yet another example where small QP slices are inserted in temporally consecutive pictures according to Embodiment 5 of the present invention.

FIGS. 13, 14, and 15 each is a diagram illustrating yet another example where small QP slices are inserted in temporally consecutive pictures according to Embodiment 5 of the present invention.

As shown in FIG. 13, the positions of the two small QP slices within each of the temporally consecutive pictures may be different from those in FIG. 12. FIG. 13 illustrates an example where in the temporally consecutive pictures, the position of the small QP slice shifts downward by one slice, and there is a picture having a small QP slice at the top immediately after the picture which has the small QP slice at the bottom. In the case where the number of bits in the network transmission is averaged per picture instead of per slice, it is preferable that each picture includes two small QP slices.

The number of slices in each of the temporally consecutive pictures does not need to be five. In addition, it does not have to be that the number of small QP slices included in each picture is one or two. For example, as shown in FIG. 14 and FIG. 15, it may be that six slices are included in each of the temporally consecutive pictures and two small QP slices are included in each picture. Furthermore, similar to the above, as shown in FIG. 14 and FIG. 15, it may be that the insertion position of the small QP slices may be different.

FIG. 14 illustrates an example where small QP slices are arranged such that in the coding temporal order, the number of normal QP slices between a small QP slice and a subsequent QP slice is two, three, two, three, etc. By doing so, the number of bits in the network transmission can be averaged, so that the same advantageous effects as those of Embodiment 1 can be obtained.

FIG. 15 illustrates an example where in the temporally consecutive pictures, the position of the small QP slice shifts downward by one slice, and there is a picture having a small QP slice at the top immediately after the picture having a small QP slice at the bottom. In the case where the number of bits in the network transmission is averaged per picture instead of per slice, it is preferable that each picture includes two small QP slices.

(Embodiment 6)

Next, Embodiment 6 is described.

In Embodiments 1 to 5, the structures and the methods have been described where the coding distortion can be made visually less noticeable, that is, where the coding distortion in moving pictures with slight motion or negligible motion can be reduced. However, in transmission of a stream over the network, part of a stream may be lost due to network congestion or the like. In such a case, first it is necessary to prevent errors caused due to network congestion or the like from propagating (in other words, it is necessary to stop errors). In Embodiment 6, a structure and a method is described in consideration with the case where part of a stream is lost due to network congestion or the like.

FIG. 16A and FIG. 16B each illustrates an example where I-slices or small QP slices are inserted in temporally consecutive pictures according to Embodiment 6 of the present invention.

Hereinafter, in temporally consecutive pictures, a unit of a predetermined number of pictures in which a certain slice such as a small QP slice or an I-slice cyclically shifts at each of the positions in pictures is referred to a unit of the number of pictures in a cyclic shift of slices, that is, sGOP. For example, in FIG. 16A and FIG. 16B, in temporally consecutive pictures, the sGOP includes the number of pictures required from a picture having the I-slice at the top to a picture one before a picture having the I-slice at the top next time after cyclic shift of the position of the I-slice.

As shown in FIG. 16A, there is a conventional technique where the position of the I-slice within each picture cyclically shifts through temporally consecutive pictures. In the technique, the I-slice instead of the I-picture cyclically shifts so that the number of bits in the network transmission is averaged. By inserting I-slices which do not use inter-coding in such a manner, it is possible to stop that errors of loss of part of a stream caused due to network congestions or the like are propagated in inter-coding.

On the other hand, in Embodiment 6, first, propagation of errors that are caused due to network congestion or the like is prevented (errors are stopped), and then the coding distortion in moving pictures with slight motion or negligible motion is reduced.

In other words, as shown in FIG. 16B, the I-slice cyclically shifts in the first sGOP (unit of the number of pictures in cyclic shift of slices) among temporally consecutive pictures, and then the small QP slice cyclically shifts in each of the subsequent sGOPs.

More specifically, each of the temporally consecutive pictures is divided into slices of five rows, and one of the slices, I-slice, shifts within a picture through five pictures in the first sGOP. Then, the subsequent picture consists of only P slices (normal QP slices). Next, a small QP slice is inserted at the position where the I-slice was previously inserted, and the small QP slice cyclically shifts in each sGOP.

In this way, among the temporally consecutive pictures, the position of the I-slice or the small QP slice within a picture cyclically shifts in each sGOP.

In other words, the position of the I-slice or the small QP slice cyclically shifts in each sGOP as follows.

(1) Either an I-slice or a small QP slice (P-slice) is inserted at a certain slice position which cyclically shifts.

(2) The I-slice or the small QP slice (P-slice) is inserted at a certain position according to the same rule.

As a result, the I-slice and the small QP slice with the number of bits (data) greater than that of the normal P-slice are inserted at a same cycle. Thus, variation in the number of bits per picture also becomes periodic. This results in less variation in the average bit rate in the transmission over the network.

Accordingly, the bit rate of the data (stream) in transmission over the network is constant; and thus, smaller capacity of the transmitting and receiving buffer is necessary, and transmission can be performed with only a low delay. In addition, the variation in the bit rate of data (stream) transmitted over the network is small; and thus, influences of the loss of data caused due to network congestion or the like can be reduced.

In many cases, network communicating units can detect data to loss caused due to network congestion or the like. Thus, it is most efficient that the period during which data loss is detected is set to the sGOP of I-slices, and the period during which no data loss is detected is set to the sGOP of small QP slices.

Next, a moving picture coding device including the functional structure which achieves the above will be described.

Figure 17:
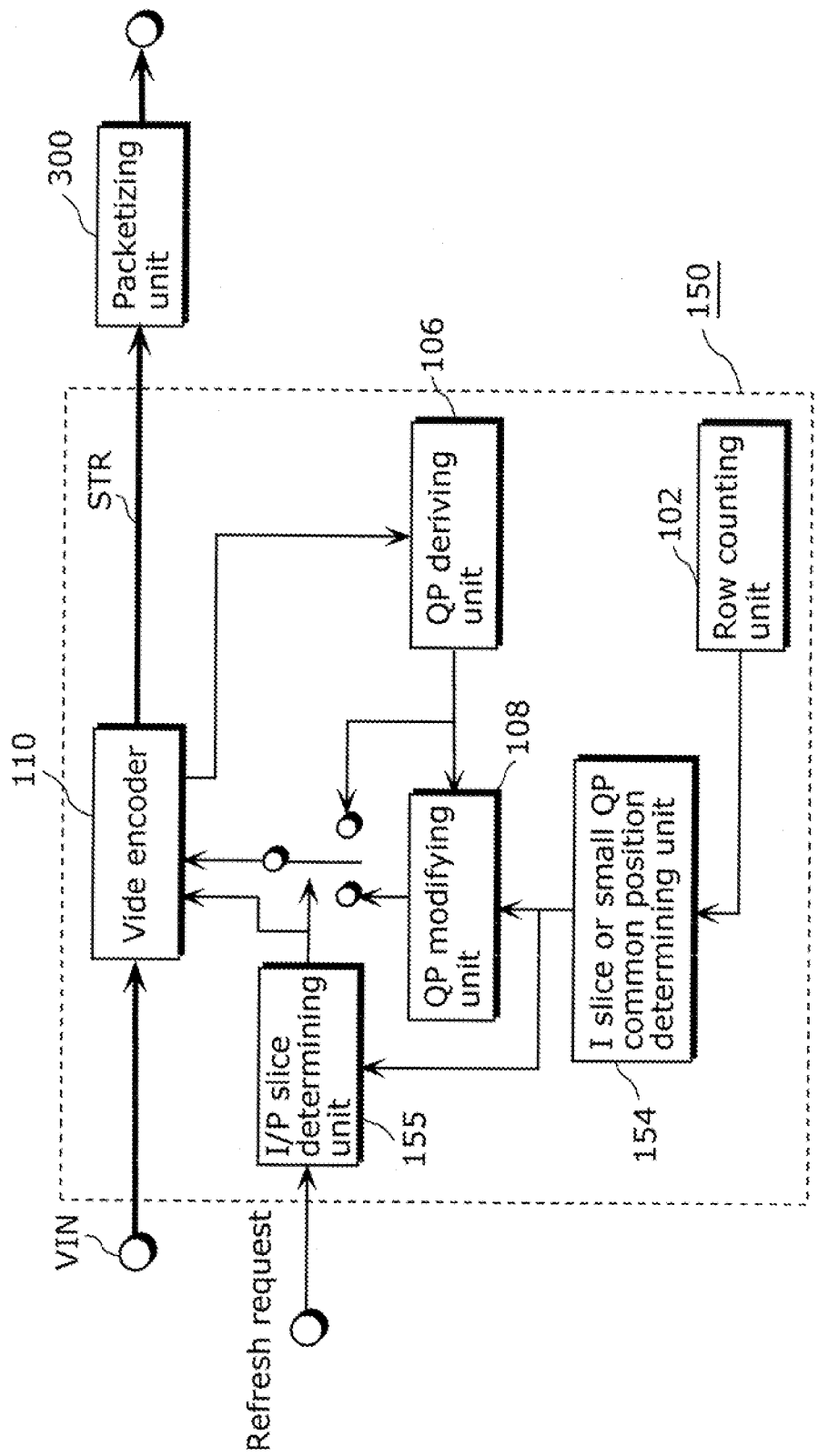
FIG. 17 is a block diagram illustrating a structure of a moving picture coding device according to Embodiment 6 of the present invention.

FIG. 17 is a block diagram illustrating a structure of a moving picture coding device according to Embodiment 6 of the present invention. The same numerals are used for the same elements as in FIG. 4, and thus the detailed description thereof will be omitted.

A moving picture coding device 150 shown in FIG. 17 differs from the moving picture coding device 100 shown in FIG. 4 in the I-slice or small QP slice common position determining unit 154 and the I/P slice determining unit 155.

The I-slice or small QP slice common position determining unit 154 determines the position of the I-slice or the small QP slice. More specifically, the I-slice or small QP slice common position determining unit 154 determines, based on the number of rows notified by the row counting unit 102, whether the slices to be coded by the video encoder 110 is to be normal QP slices or either I-slices or small QP slices.

The I/P slice determining unit 155 determines the slices to be coded by the video encoder 110 to be I-slices or P-slices.

More specifically, the I/P slice determining unit 155 determines the slices to be coded by the video encoder 110 to be I-slices, in the case where a refresh request is received at a predetermined time interval or at random times. Here, the refresh request refers to a request for inserting an intra-coded slice, that is an I-slice. The refresh request is output to the moving picture coding device 150 that is included in a transmitting device, but not in a receiving device, so as to, for example, restore image degradation caused when data loss occurs during the network transmission. The output refresh request is received by the I/P slice determining unit 155. In addition, the refresh request is received by the I/P slice determining unit 155 at a predetermined time interval.

Upon receipt of a refresh request, the I/P slice determining unit 155 determines, to be the I-slices, the slices at the positions where the small QP slices or the I-slices were set, among to the sGOP including the temporally consecutive pictures included in the slices to be coded by the video encoder 110. The receiving device is, for example, a moving picture decoding device which decodes streams coded by the moving picture coding device 150.

Furthermore, in the other cases, the I/P slice determining unit 155 determines the slices to be coded by the video encoder 110 to be P-slices.

The video encoder 110 codes the slices at the position determined by the I-slice or small QP slice common position determining unit 154 as I-slices or P-slices, based on the determination of the I/P slice determining unit 155. When coding the slice to be coded as an I-slice, the video encoder 110 codes the slice using the normal quantization step derived by the QP deriving unit 106, instead of using the small quantization step notified by the QP modifying unit 108. On the other hand, when coding the slice to be coded as a small QP slice, the video encoder 110 codes the slice using the small quantization step notified by the QP modifying unit 108.

The moving picture coding device 150 is thus structured.

Next, coding processing performed by the moving picture coding device 150 will be described.

Figure 18:
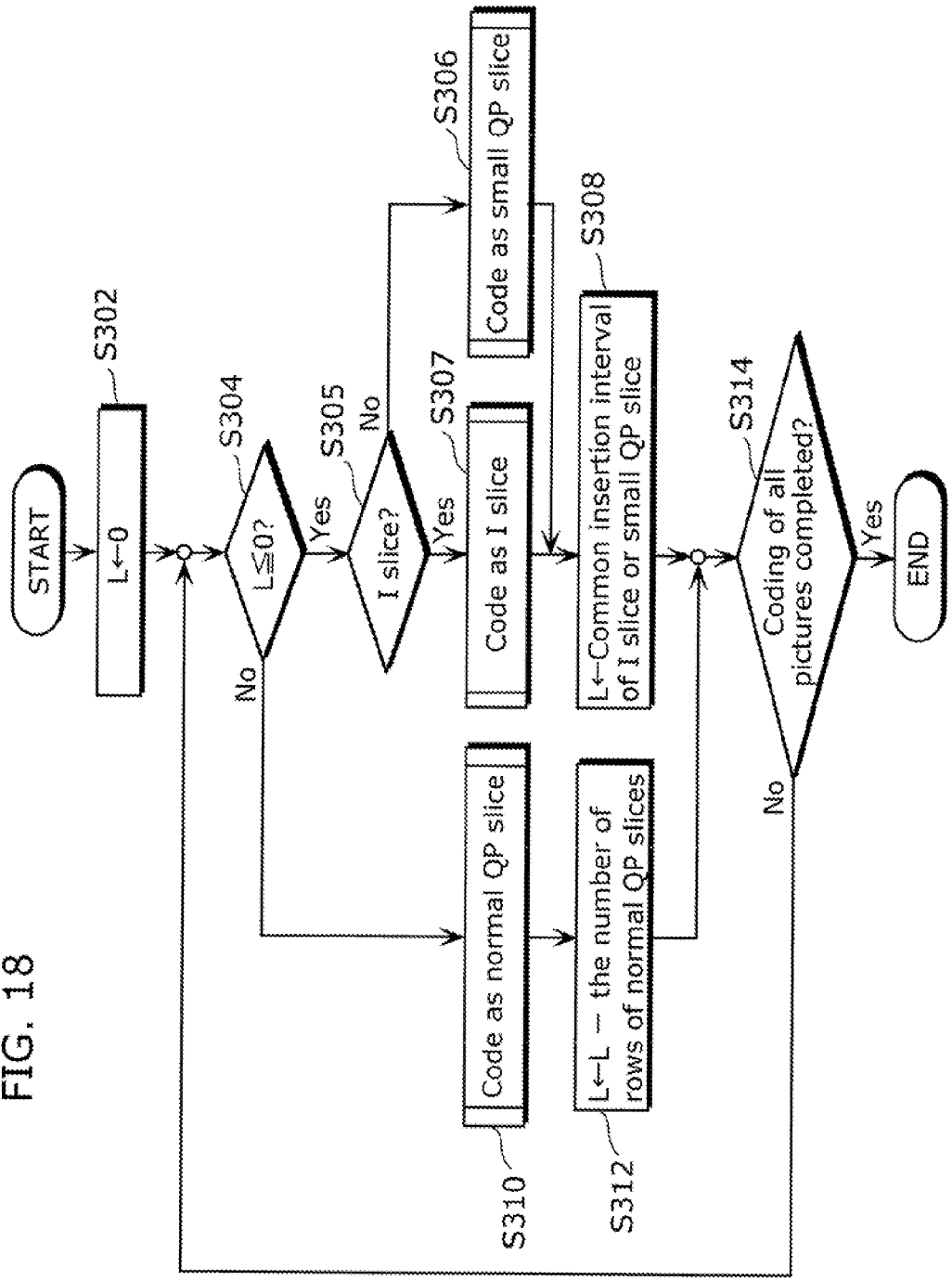
FIG. 18 is a flowchart of coding processing performed by the moving picture coding device according to Embodiment 6 of the present invention.

FIG. 18 is a flowchart of coding processing performed by the moving picture coding device according to Embodiment 6 of the present invention.

First, the row counting unit 102 initializes the counter L to 0. The counter L is a value indicating the number of rows of the slices to be coded by the video encoder 110 (S302).

Next, the I-slice or small QP slice common position determining unit 154 determines the position of the I-slice or the small QP slice. In other words, the I-slice or small QP slice common position determining unit 154 determines whether the slices to be coded by the video encoder 110 to be normal QP slices or to be either I-slices or small QP slices, based on the number of rows notified by the row counting unit 102.

More specifically, first, the I-slice or small QP slice common position determining unit 154 determines whether the counter L is equal to or smaller than 0 (S304).

Next, the I-slice or small QP slice common position determining unit 154 determines whether or not the slices to be coded by the video encoder 110 is to be coded as I-slices, in the case where the counter L is equal to or smaller than 0 (Yes in S304).

More specifically, in the case where a refresh request is received at a predetermined interval or at random times, the I/P slice determining unit 155 determines, to be I-slices, the slices of the sGOP which are to be coded by the video encoder 110 and are determined by the I-slice or small QP slice common position determining unit 154. In the other cases, the I/P slice determining unit 155 determines, to be P-slices, the slices which are to be coded by the video encoder 110 and are determined by the I-slice or small QP slice common position determining unit 154.

Next, when determined that the slices to be coded are I-slices (Yes in S305), the video encoder 110 codes the slices at the position determined by the I-slice or small QP slice common position determining unit 154 as I-slices, using the normal quantization step derived by the QP deriving unit 106 (5307).

On the other hand, when determined that the slices to be coded are not coded as I-slices (No in S305), the video encoder 110 codes the slices as P-slices that are small QP slices, using the small quantization step notified by the QP modifying unit 108 (5306).

Next, in the case where the video encoder 110 codes the slices at the position determined by the I-slice or small QP slice common position determining unit 154 as I-slices or small QP slices, the row counting unit 102 assigns, to the counter L, the common insertion interval of the I-slices and small QP slices in the consecutive pictures (S308). Here, the common insertion interval of the I-slices and small QP slices refers to a (total) value of the number of rows of slices inserted between an I-slice or a small QP slice and a subsequent I-slice or small QP slice within or between temporally consecutive pictures.

Next, the I-slice or small QP slice common position determining unit 154 checks if the video encoder 110 completed coding of all pictures (S314).

In the case where the counter L is greater than 0 (No in S304), the I-slice or small QP slice common position determining unit 154 determines the slices to be coded by the video encoder 110 to be P-slices that are normal QP slices, based on the number of rows notified by the row counting unit 102.

Next, the video encoder 110 codes the slices at the position determined by the I-slice or small QP slice common position determining unit 154 as normal QP slices, using a normal quantization step (S310). The row counting unit 102 subtracts, from the counter L, the number or rows of the slices (normal QP slices) coded by the video encoder 110 (S312).

Next, the I-slice or small QP slice common position determining unit 154 checks if the video encoder 110 completed coding of all pictures (S314). When not completed (No in S314), the processing of S304 to S314 is repeated till all pictures are coded.

In such a manner, the moving picture coding device 150 according to Embodiment 6 performs coding and is capable of inserting a certain number of slices between an I-slice or a small QP slice and a subsequent I-slice or small QP slice between consecutive pictures.

As described, according to Embodiment 6, it is possible to achieve the moving picture coding device 150 which reduces the coding distortion in moving pictures with slight motion or negligible motion such that errors caused due to network congestion or the like is not propagated and the coding distortion becomes visually less noticeable.

Embodiment 6 has been described with a combination with Embodiment 1 where a picture consisting of only normal QP slices is inserted in each sGOP; however, the present invention is not limited to the example. Instead of Embodiment 1, any of Embodiment 2 to Embodiment 5 may be combined.

Furthermore, in Embodiment 6, as a preferred example which is easily implementable, it has been described that small QP slices and I-slices are exclusively inserted in temporally consecutive pictures; however, the present invention is not limited to the example. In other words, small QP slices and I-slices may be simultaneously inserted in temporally consecutive pictures. In such a case, it is sufficient that small QP slices are inserted and cyclically shift in a similar manner as described in Embodiment 1 to Embodiment 5, and the I-slices are inserted only in the first sGOP after a refresh request is received.

In addition, in Embodiment 6, the example has been described where a QP slice or an I-slice cyclically shifts through temporally consecutive pictures; however, the present invention is not limited to the example. Instead of the slices, a group of blocks including pixels or blocks may cyclically shift. In such a case, a small QP block instead of a small QP slice and an I-block (a group of intra-coded blocks) instead of an I-slice may cyclically shift.

Furthermore, it has been described that when coding the target slices as I-slices, the video encoder 110 codes the slices using the normal quantization step derived by the QP deriving unit 106 instead of the small quantization step notified by the QP modifying unit 108. However, it may be that an I-slice is also coded with the small quantization step to improve image quality in the case where some variations in the number of bits per slice are acceptable.

(Embodiment 7)

Next, Embodiment 7 is described.

Figure 19:
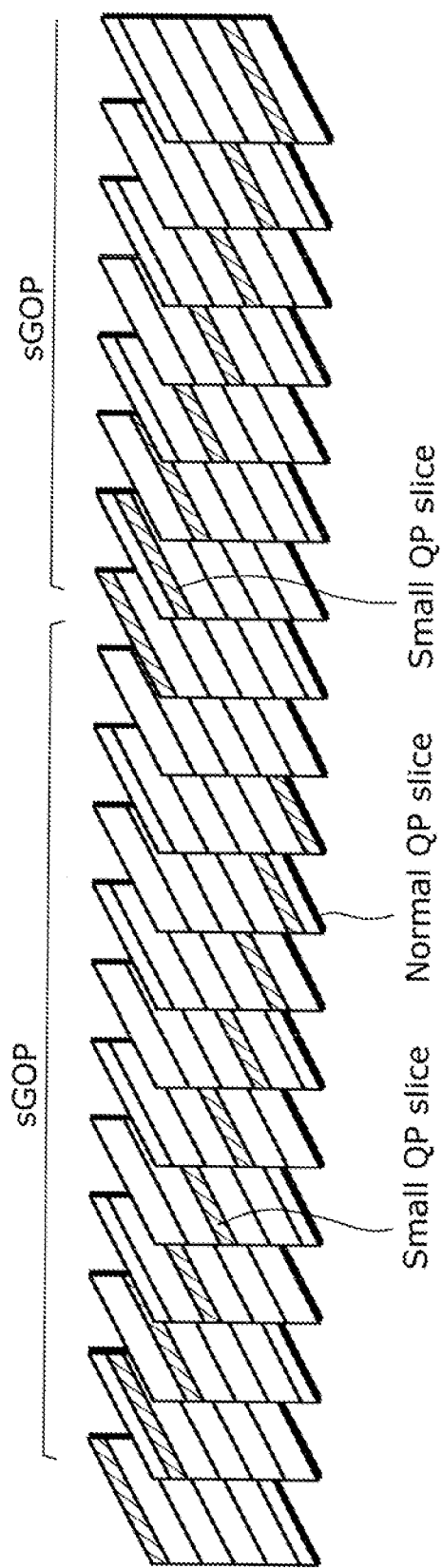
FIG. 19 is a diagram illustrating an example where small QP slices are inserted in temporally consecutive pictures according to Embodiment 7 of the present invention.

FIG. 19 is a diagram illustrating an example where small QP slices are inserted in temporally consecutive pictures according to Embodiment 7 of the present invention.

In Embodiment 1 to Embodiment 6, the case has been mainly described where the size (the number of blocks or pixels included in a slice) of the small QP slice equals to the size of the normal QP slice; however, the present invention is not limited to such a case. As shown in FIG. 19, the size of the small QP slices inserted in pictures may be smaller than that of the normal QP slices.

With this, it is possible to reduce, per slice, the number of bits of small QP slices having a large number of bits per block.

Here, in transmission over the network per slice, it is preferable that the number of bits per slice between a normal QP slice and a small QP slice is approximately the same. The reason is that by transmitting slices at temporally and spatially equal interval over the network, the bit rate can be made almost constant.

As described, the bit rate of data (streams) transmitted over the network can be made constant; and thus, the capacity of the transmitting and receiving buffer can be reduced and transmission with only a low delay is possible. Furthermore, since variation in the bit rate of data (streams) transmitted over the network is small, loss of data due to network congestion can be reduced.

(Embodiment 8)

For example, picture signals according to interlaced pictures are not only consecutive pictures consisting of frames but also consecutive pictures consisting of fields. In Embodiment 1 to Embodiment 6, the example has been described where pictures consists of frames; however, the present invention is not limited to such example. Pictures may consist of fields. In such a case, the above methods can also be applied in the similar manner. Hereinafter, such a case will be described as Embodiment 8.

Figure 20:
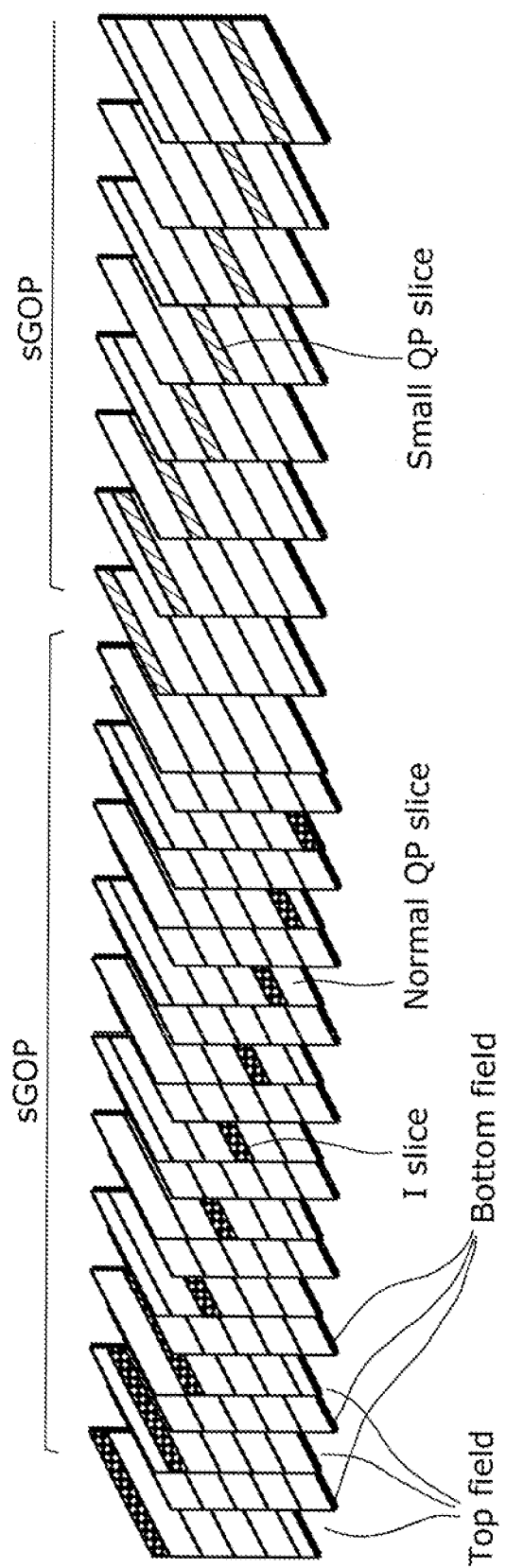
FIG. 20 is a diagram illustrating an example where small QP slices are inserted in temporally consecutive pictures according to Embodiment 8 of the present invention.

FIG. 20 is a diagram illustrating an example where small QP slices are inserted in temporally consecutive pictures according to Embodiment 8 of the present invention.

An interlaced picture includes a top field and a bottom field. As shown in FIG. 20, when the interlaced picture starts, for example, from the top field, it is sufficient to insert I-slices or small QP slices only in the top fields.

In such a manner, by inserting I-slices only in one of the two fields (top field and bottom field) and cyclically shifts the I-slices through an sGOP, it is possible to prevent propagation of errors caused due to network congestion or the like. In addition, by inserting small QP slices at an interval (cycle) same as that of the I-slices having a large number of bits, it is possible to reduce variation in the average bit rate in transmission over the network.

Accordingly, the bit rate of data (streams) transmitted over the network can be constant; and thus, it is possible to reduce capacity of a transmitting and receiving buffer and to perform transmission with only a low delay. Furthermore, since variation in the bit rate of data (streams) transmitted over the network is small, loss of data due to network congestion or the like can be reduced.

The example has been described where I-slices or small QP slices are inserted only in the top fields that are one of the two fields (top field and bottom field), the present invention is not limited to such example. I-slices or small QP slices may be inserted only in the bottom fields.

(Embodiment 9)

Next, Embodiment 9 is described.

Here, a program for implementing the moving picture coding device 100, 150, or 200 described in each of the embodiments is recorded on a recording medium such as a flexible disk. By doing so, the processing described in the above embodiments can be easily performed in an independent computer system.

Figure 21A:
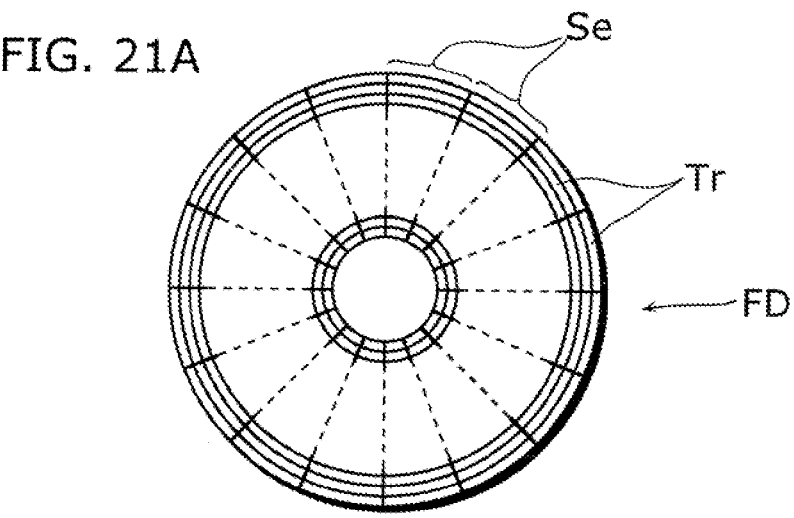
FIG. 21A is a diagram illustrating a recording medium which stores a program for implementing, in a computer system, a moving picture coding device according to each embodiment.
Figure 21B:
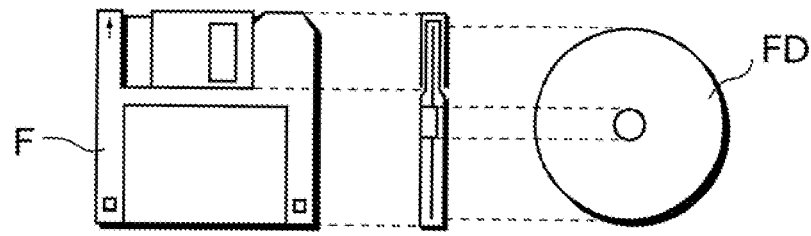
FIG. 21B is a diagram illustrating a recording medium which stores a program for implementing, in a computer system, the moving picture coding device according to each embodiment.
Figure 21C:
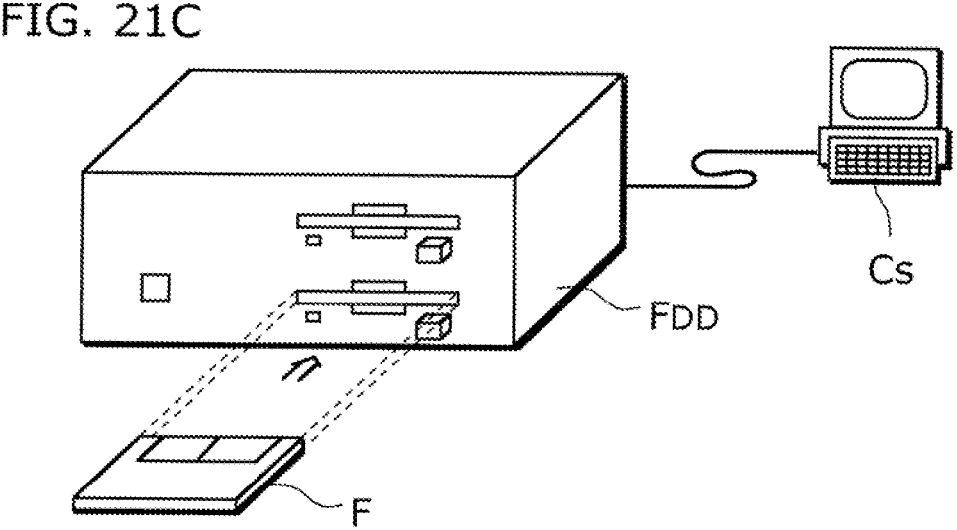
FIG. 21C is a diagram illustrating a recording medium which stores a program for implementing, in a computer system, the moving picture coding device according to each embodiment.
Figure 22:
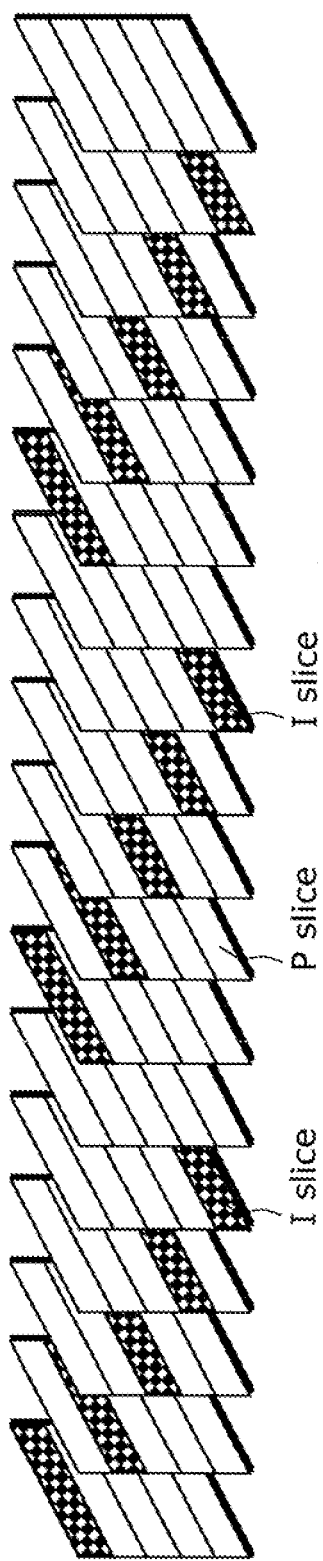
FIG. 22 is a diagram illustrating an example where I-slices are inserted in temporally consecutive pictures.
Figure 23:
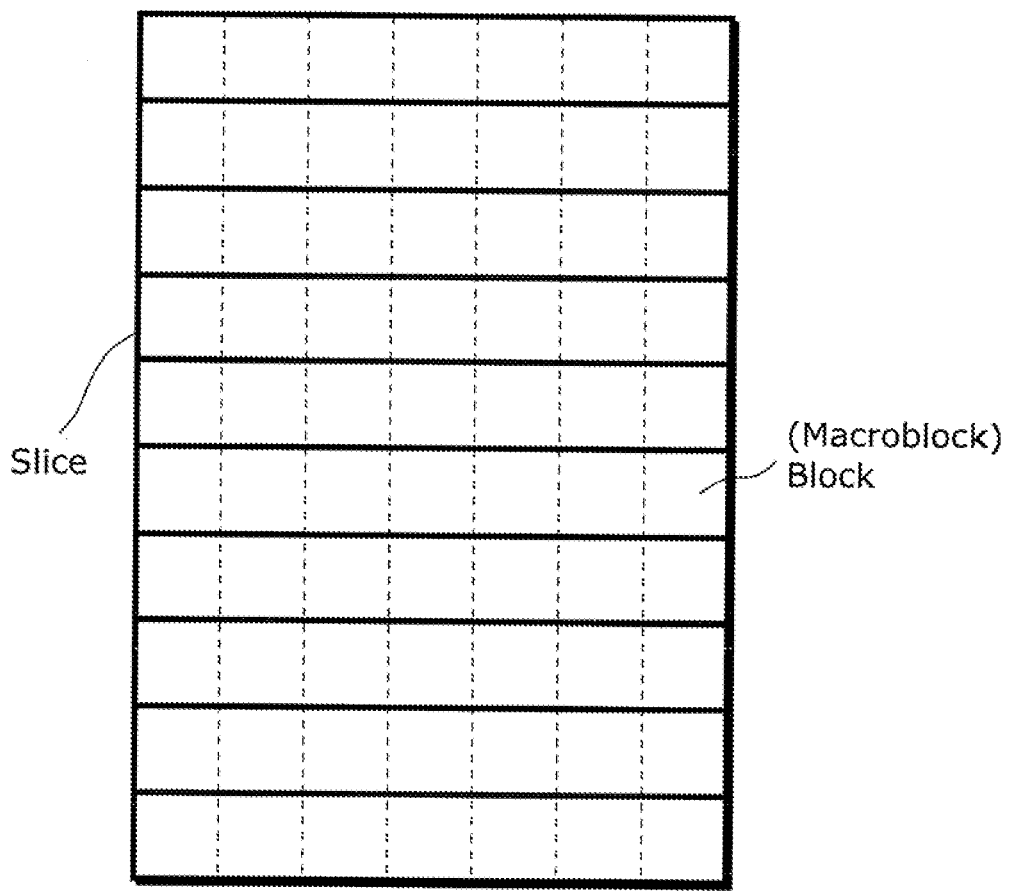
FIG. 23 is a diagram illustrating a relationship between slices and blocks in accordance with MPEG-2.

FIG. 21A to FIG. 21C each is a diagram illustrating a case where the moving picture coding device 100, 150 or 200 according to the embodiments is implemented in a computer system, using the program recorded on the recording medium such as a flexible disk.

FIG. 21B illustrates an external front view and a cross-sectional view of a flexible disk and the flexible disk. FIG. 21A illustrates an example of a physical format of the flexible disk that is a recording medium body. A flexible disk FD is contained in a case F. A plurality of tracks Tr are formed concentrically on the surface of the disk from the periphery into the inner radius of the disk. Each track Tr is divided into 16 sectors Se in the angular direction. Accordingly, in the flexible disk which stores the program, the program is recorded on sectors assigned to the flexible disk FD.

FIG. 21C illustrates a structure for recording and reproducing the program on the flexible disk FD. When the program for implementing the moving picture coding device 100, 150, or 200 is recorded on the flexible disk FD, the computer system Cs writes the program on the flexible disk FD via a flexible disk drive. When the moving picture coding device 100, 150, or 200 is constructed in the computer system using the program on the flexible disk, the program is read out from the flexible disk using the flexible disk drive and is transferred to the computer system.

The above description is given on an assumption that a recording medium is a flexible disk, but an optical disk can be used instead. In addition, the recording medium is not limited to the flexible disk and the optical disk. As long as the program is recorded, any recording medium may be used, such as an IC card and a ROM cassette.

According to the present invention, by including a small QP slice (or small QP block) to be coded with a small quantization step within a picture, and shifting the position within a picture in the coding order through temporally consecutive pictures, the position of the small QP slice (or small QP block) within a picture can be cyclically shifted through the consecutive pictures in a predetermined cycle.

Therefore, coding with small coding distortion is performed at a predetermined cycle at each of the slice positions in pictures. This allows reduced coding distortion in moving pictures with slight motion or negligible motion. As a result, the coding distortion becomes visually less noticeable.

This is because a slice at a predetermined position within a picture is coded as a small QP slice so that the coding distortion of the slice is reduced. Accordingly, even if a slice at the predetermined position is subsequently coded as a normal QP slice, the coding distortion does not increase (image quality is not degraded). This is particularly effective when performing inter-coding on pictures with smaller residual (pictures with slight motion, or pictures where pixels indicates only simple motion such as horizontal movement).

In each picture, the quantization step size for only some of the slices within a picture is reduced. As a result, the number of bits in coding of each picture becomes almost constant and transmission over the network at a constant bit rate is possible.

Furthermore, the present invention may be combined with another quantization scheme which changes the quantization step per slice or per block. In this case, the quantization step size slightly increases or decreases per slice or per block; however, the position of the slice with relatively small quantization step (small QP slice or small QP block) cyclically shifts in a predetermined cycle.

It is preferable to perform the lower limit processing as below so that the small quantization step does not become too small in a small QP slice or a small QP block. Accordingly, it is possible to prevent that the small quantization step becomes smaller than the minimum quantization step accepted in the standard or the quantization step becomes such small that the image quality degradation cannot be visually recognized.

1) The value of the small quantization step modified by the QP modifying unit 108 is clopped at a predetermined minimum value.

2) As the value of the quantization step derived by the QP deriving unit 106 is smaller, the amount of modification by the QP modifying unit 108 decreases.

In a small QP slice or a small QP block, the range of reduction of the quantization step may be changed according to the average bit rate per picture as below. Here, the reduction rage of the quantization step refers to a difference between a value of normal quantization step and a value of small quantization step.

1) When the average bit rate per picture is high, the reduction range of the quantization step increases giving priority to image quality.

2) When the average bit rate per picture is low, the reduction range of the quantization step decreases.

The reason is that when the average bit rate per picture is high, priority can be given to image quality over increase in the number of bits. On the other hand, in the case where the average bit per picture is low, when difficulty of compression of pictures is changed due to scene changes or the like, it is likely that the average bit rate per picture cannot be made constant. It is because the smaller value of the quantization step results in the increased number of bits which cannot be absorbed even by other normal QP slices.

Each of the functional blocks in the block diagrams (FIGS. 4, 9, and 17) is typically implemented as a Large Scale Integrated (LSI) circuit that is an integrated circuit. The LSIs may be separately made into one chip, or each LSI may be partly or entirely made into one chip. For example, the functional blocks other than a memory may be made into one chip. The LSI may also be referred to IC, system LSI, super LSI, or ultra LSI depending on the degree of integration.

Moreover, ways to achieve integration are not limited to the LSI. A dedicated circuit or a general-purpose processor may also achieve the integration. Field Programmable Gate Array (FPGA) that can be programmed after manufacturing an LSI or a reconfigurable processor that allows re-configuration of the connection or configuration of a circuit cell in an LSI can be used for the same purpose.

Furthermore, in the future, with advancement in semiconductor technology, a brand-new technology may replace LSI. The functional blocks may be integrated using such a technology. The possibility is that the present invention is applied to biotechnology. Furthermore, out of the functional blocks, only a means for storing data to be coded may be separately configured without making it into one chip.

Although the moving picture coding method and the moving picture coding device according to the present invention have been described based on the embodiments, the present invention is not limited to those embodiments. Those skilled in the art will readily appreciate that various kinds of modifications are possible in the exemplary embodiments and other embodiments obtained by arbitrarily combining the structural elements in the embodiments are also possible without materially departing from the novel teachings and advantages of the present invention. Accordingly, all such modifications are intended to be included within the scope of this invention.

[Industrial Applicability]

The present invention is applicable to moving picture decoding devices, and particularly to a communication device or a set of devices which codes moving pictures, such as a device for interactively communicating moving pictures using a network, a device for distributing moving pictures, or a security camera.

[Reference Signs List]

100, 150, 200 Moving picture coding device
102 Row counting unit
104, 204 Small QP position determining unit
106 QP deriving unit
108 QP modifying unit
110 Video encoder
154 I-slice or small QP slice common position determining unit
155 I/P slice determining unit
202 Block counting unit
300 Packetizing unit This invention claimed is:

1. A moving picture coding device which quantizes, per block, a plurality of pictures by using a quantization step and codes the quantized pictures, the plurality of pictures being temporally consecutive and included in a moving picture signal, said moving picture coding device comprising:
a quantization step deriving unit configured to derive, based on the moving picture signal, a quantization step and a small quantization step having a size smaller than a size of the quantization step, the small quantization step being derived from the quantization step by (i) subtracting a first constant number from the quantization step or (ii) multiplying the quantization step by a second constant number;
a position determining unit configured to determine a position, within each of the plurality of pictures, of a first block group, the first block group including one or more blocks to be inter-coded per block, the position of the first block group within the picture cyclically shifting in a coding order direction in each of a predetermined number of pictures that are temporally consecutive among the plurality of pictures that are temporally consecutive; and
a coding unit configured to quantize the first block group by using the small quantization step and a second block group by using the quantization step, and to code the quantized first and second block groups, the first block group being at the position determined by said position determining unit, the second block group including one or more blocks at a position within the picture other than the position determined by said position determining unit, the second block group being to be inter-coded per block,
wherein said position determining unit is configured to determine the position of the first block group within the picture such that the position of the first block group within the picture cyclically shifts in the coding order direction, and
wherein coding unit uses the small quantization step, which has the size smaller than the size of the quantization step used to quantize the second block group to be inter-coded per block, to quantize the first block group including the one or more block to be inter-coded per block and whose position cyclically shifting in the coding order direction in each of the predetermined number of pictures that are temporally consecutive among the plurality of pictures that are temporally consecutive.

2. The moving picture coding device according to claim 1, wherein said coding unit is configured to code the first block group and the second block group by using at least an inter-picture pixel-value prediction, the first block group being quantized by using the small quantization step, the second block group being included in the picture and being quantized by using the quantization step.

3. The moving picture coding device according to claim 2, wherein, in a case where said moving picture coding device transmits the plurality of pictures coded by said moving picture coding device at a low bit rate, said position determining unit is configured to determine that the first block group is not included in every other picture among the plurality of pictures that are temporally consecutive,
wherein said coding unit is configured to quantize a picture by using the quantization step and code the quantized picture, the picture being determined by said position determining unit that the first block group is not included and including only the second block group.

4. The moving picture coding device according to claim 2, wherein said position determining unit is further configured to determine that the first block group is not included in periodic pictures among the plurality of pictures that are temporally consecutive, and
wherein said coding unit is configured to quantize the pictures by using the quantization step and to code the quantized pictures, the pictures being determined by said position determining unit that the first block group is not included and including only the second block group.

5. The moving picture coding device according to claim 2, wherein said position determining unit is configured to determine, per picture, the position of the first block group within each of the plurality of pictures.

6. The moving picture coding device according to claim 2, wherein the first block group includes a plurality of first block groups, and
wherein said position determining unit is configured to determine positions of the plurality of first block groups within each of the plurality of pictures.

7. The moving picture coding device according to claim 3, further comprising
a slice dividing unit configured to divide each of the plurality of pictures into a plurality of slices each including one or more blocks.

8. The moving picture coding device according to claim 1, wherein each of the plurality of pictures that are temporally consecutive is divided into a plurality of slices each including one or more blocks,
wherein said position determining unit is configured to (i) determine, within each of the plurality of pictures, a position of a first slice included in the plurality of slices in the picture and including the first block group to be quantized by using the small quantization step, and (ii) determine the position of the first slice within the picture such that the position of the first slice within the picture cyclically shifts in the coding order direction in each of a predetermined number of pictures that are temporally consecutive among the plurality of pictures, and
wherein said coding unit is configured to quantize the first block group by using the small quantization step and the second block group by using the quantization step, and code the quantized first and second block groups, the first block group being included in the first slice at the position determined by said position determining unit, the second block group being included in a plurality of slices at a position within the picture other than the position determined by said position determining unit.

9. A moving picture coding method for quantizing, per block, a plurality of pictures by using a quantization step and coding the quantized pictures, the plurality of pictures being temporally consecutive and included in a moving picture signal, said moving picture coding method comprising:

deriving, based on the moving picture signal, a quantization step and a small quantization step having a size smaller than a size of the quantization step, the small quantization step being derived from the quantization step by (i) subtracting a first constant number from the quantization step or (ii) multiplying the quantization step by a second constant number;

determining a position, within each of the plurality of pictures, of a first block group, the first block group including one or more blocks to be inter-coded per block, the position of the first block group within the picture cyclically shifting in a coding order direction in each of a predetermined number of pictures that are temporally consecutive among the plurality of pictures that are temporally consecutive; and quantizing, using a processor, the first block group by using the small quantization step and a second block group by using the quantization step, and coding the quantized first and second block groups, the first block group being at the position determined in said determining, the second block group including one or more blocks at a position within the picture other than the position determined in said determining, the second block group being to be inter-coded per block, wherein in said determining, the position of the first block group within the picture is determined such that the position of the first block group within the picture cyclically shifts in the coding order direction, and wherein the small quantization step, which has the size smaller than the size of the quantization step used to quantize the second block group to be inter-coded per block, is used to quantize the first block group including the one or more block to be inter-coded per block and whose position cyclically shifting in the coding order direction in each of the predetermined number of pictures that are temporally consecutive among the plurality of pictures that are temporally consecutive.

10. A non-transitory computer-readable recording medium for use in a computer, said recording medium having a computer program recorded thereon, the program being for quantizing, per block, a plurality of pictures by using a quantization step and coding the quantized pictures, the plurality of pictures being temporally consecutive and included in a moving picture signal, the program causing the computer to execute:

deriving, based on the moving picture signal, a quantization step and a small quantization step having a size smaller than a size of the quantization step, the small quantization step being derived from the quantization step by (i) subtracting a first constant number from the quantization step or (ii) multiplying the quantization step by a second constant number;

determining a position, within each of the plurality of pictures, of a first block group, the first block group including one or more blocks to be inter-coded per block, the position of the first block group within the picture cyclically shifting in a coding order direction in each of a predetermined number of pictures that are temporally consecutive among the plurality of pictures that are temporally consecutive; and quantizing the first block group by using the small quantization step and a second block group by using the quantization step, and coding the quantized first and second block groups, the first block group being at the position determined in said determining, the second block group including one or more blocks at a position within the picture other than the position determined in said determining, the second block group being to be inter-coded per block, wherein in said determining, the position of the first block group within the picture is determined such that the position of the first block group within the picture cyclically shifts in the coding order direction, and wherein the small quantization step, which has the size smaller than the size of the quantization step used to quantize the second block group to be inter-coded per block, is used to quantize the first block group including the one or more block to be inter-coded per block and whose position cyclically shifting in the coding order direction in each of the predetermined number of pictures that are temporally consecutive among the plurality of pictures that are temporally consecutive.

11. An integrated circuit which quantizes, per block, a plurality of pictures by using a quantization step and codes the quantized pictures, the plurality of pictures being temporally consecutive and included in a moving picture signal, said integrated circuit comprising:

a quantization step deriving unit configured to derive, based on the moving picture signal, a quantization step and a small quantization step having a size smaller than a size of the quantization step, the small quantization step being derived from the quantization step by (i) subtracting a first constant number from the quantization step or (ii) multiplying the quantization step by a second constant number;

a position determining unit configured to determine a position, within each of the plurality of pictures, of a first block group, the first block group including one or more blocks to be inter-coded per block, the position of the first block group within the picture cyclically shifting in a coding order direction in each of a predetermined number of pictures that are temporally consecutive among the plurality of pictures that are temporally consecutive; and a coding unit configured to quantize the first block group by using the small quantization step and a second block group by using the quantization step, and to code the quantized first and second block groups, the first block group being at the position determined by said position determining unit, the second block group including one or more blocks at a position within the picture other than the position determined by said position determining unit, the second block group being to be inter-coded per block, wherein said position determining unit is configured to determine the position of the first block group within the picture such that the position of the first block group within the picture cyclically shifts in the coding order direction, and wherein coding unit uses the small quantization step, which has the size smaller than the size of the quantization step used to quantize the second block group to be inter-coded per block, to quantize the first block group including the one or more block to be inter-coded per block and whose position cyclically shifting in the coding order direction in each of the predetermined number of pictures that are temporally consecutive among the plurality of pictures that are temporally consecutive.

* * * * *